US012761346B2

(12) United States Patent
Greenidge et al.

(10) Patent No.: US 12,761,346 B2
(45) Date of Patent: Oct. 13, 2026

(54) RADAR USING END-TO-END RELAY

(71) Applicant: Viasat Inc., Carlsbad, CA (US)

(72) Inventors: David D. Greenidge, Longmont, CO (US); Kenneth V. Buer, Bluff City, TN (US); Craig A. Miller, Carlsbad, CA (US); David J. Hancharik, Norcross, GA (US)

(73) Assignee: Viasat, Inc., Carlsbad, CA (US)

( * ) Notice: Subject to any disclaimer, the term of this patent is extended or adjusted under 35 U.S.C. 154(b) by 511 days.

(21) Appl. No.: 18/036,942

(22) PCT Filed: Nov. 17, 2020

(86) PCT No.: PCT/US2020/060922
§ 371 (c)(1),
(2) Date: May 15, 2023

(87) PCT Pub. No.: WO2022/108577
PCT Pub. Date: May 27, 2022

(65) Prior Publication Data

US 2023/0417903 A1 Dec. 28, 2023

(51) Int. Cl.
*G01S 13/90* (2006.01)
*G01S 7/00* (2006.01)
(Continued)

(52) U.S. Cl.
CPC .......... *G01S 13/9058* (2019.05); *G01S 7/003* (2013.01); *H01Q 25/007* (2013.01); *H04B 7/18515* (2013.01); *H04B 7/2041* (2013.01)

(58) Field of Classification Search
CPC ... G01S 13/9058; G01S 7/003; H01Q 25/007; H04B 7/18515; H04B 7/2041
See application file for complete search history.

(56) References Cited

U.S. PATENT DOCUMENTS 4,602,257 A 7/1986 Grisham
6,388,606 B1 5/2002 Keydel et al.
(Continued)

FOREIGN PATENT DOCUMENTS

CN 101584131 A 11/2009
CN 108535725 A 9/2018
(Continued)

OTHER PUBLICATIONS

International Search Report and Written Opinion, PCT/US2020/060922, dated Sep. 15, 2021, 18 pages.

*Primary Examiner* — Resha Desai
*Assistant Examiner* — Peter Davon Doze
(74) *Attorney, Agent, or Firm* — Holland & Hart LLP

(57) ABSTRACT

A multi-static synthetic aperture radar using beamforming processing is described. A reception processing system may process feed element signals (e.g., from feed elements on a satellite or from access node terminals in an end-to-end relay system) according to multiple beam weight sets, each corresponding to a beam coverage pattern including one or more radar image pixel beams to generate a set of beam signals. The feed element signals may represent signal energy from a reflected illumination signal (e.g., beacon signal, communication signal), or passively received signal energy (e.g., without a corresponding illumination signal). The multiple sets of beam signals obtained from processing the feed element signals may then be processed to obtain image pixel values, and the image pixel values combined to obtain an image. Multiple sets of feed element signals (e.g., each corresponding to a time period) may be processed and combined to form the image.

28 Claims, 9 Drawing Sheets

(51) Int. Cl.

| | |
|---|---|
| ***H01Q 25/00*** | (2006.01) |
| ***H04B 7/185*** | (2006.01) |
| ***H04B 7/204*** | (2006.01) |

(56) References Cited

U.S. PATENT DOCUMENTS

| | | | | |
|---|---|---|---|---|
| 6,677,884 | B2 | 1/2004 | Moreira et al. | |
| 7,486,224 | B2 | 2/2009 | Ghaleb et al. | |
| 7,633,427 | B2 | 12/2009 | Nelson | |
| 7,911,372 | B2 | 3/2011 | Nelson | |
| 9,869,763 | B2 | 1/2018 | Calabrese | |
| 9,973,266 | B1 | 5/2018 | Avellan et al. | |
| 10,574,338 | B1 * | 2/2020 | Chang | H04B 7/18504 |
| 10,574,388 | B2 | 2/2020 | Lee et al. | |
| 2003/0215110 | A1 * | 11/2003 | Rhoads | G06F 16/58 382/100 |
| 2007/0090990 | A1 | 4/2007 | Nelson | |
| 2010/0045512 | A1 | 2/2010 | Nelson | |
| 2015/0378018 | A1 | 12/2015 | Calabrese | |
| 2017/0199266 | A1 * | 7/2017 | Rice | G01S 5/021 |
| 2017/0205536 | A1 | 7/2017 | Musso | |
| 2019/0101639 | A1 | 4/2019 | Rincon et al. | |

FOREIGN PATENT DOCUMENTS

| | | | | |
|---|---|---|---|---|
| CN | 10221299 | A | 9/2019 | |
| DE | 102013221756 | B3 * | 10/2014 | G01S 13/30 |
| GB | 2 547 548 | A1 | 8/2017 | |
| WO | 2015059043 | A2 | 4/2015 | |
| WO | 2020214674 | A1 | 10/2020 | |

* cited by examiner

RADAR USING END-TO-END RELAY

CROSS REFERENCE

The present Application for Patent is a 371 national stage filing of International Patent Application No. PCT/US2020/060922 by Greenidge, et al., entitled "MULTI-STATIC SYNTHETIC APERTURE RADAR USING END-TO-END RELAY", filed Nov. 17, 2020, assigned to the assignee hereof, and expressly incorporated by reference in its entirety herein.

BACKGROUND

The following relates generally to beamformed antenna systems and more specifically to multi-static synthetic aperture radar. In some beamformed antenna systems, such as a satellite communication system, a receiving device may include an antenna configured to receive signals at each of a set of feed elements of a feed array. A set of feed element signals may be processed according to a receive beamforming configuration, which may include applying a phase shift or amplitude scaling to respective ones of the feed element signals. The processing may be associated with generating spot beam signals corresponding to various spot beam coverage areas, which, in some examples, may support various allocations of communication resources across a service coverage area of the antenna.

SUMMARY

The described techniques relate to improved methods, systems, devices, and apparatuses that support multi-static synthetic aperture radar. In some examples, an antenna may be included in a vehicle such as a satellite, a plane, an unmanned aerial vehicle (UAV), or some other type of device that supports a communications service or other reception capability over a service coverage area. The antenna may include a feed array having a set of feed elements, and each of the feed elements may be associated with a feed element signal corresponding to received energy at the respective feed element. Alternatively, the device may relay signals received at the feed array via a corresponding feed array (e.g., the same or a different feed array). A ground system (e.g., multiple access node terminals) may receive the relayed signals. A reception processing system may receive the signals (e.g., feed element signals or access node signals), or other related signaling, and perform various beamforming techniques to support directional reception.

To support real-time communications, the reception processing system may process received signaling, such as feed element signals, according to a first beamforming configuration to generate one or more spot beam signals. Each of the spot beam signals may correspond to a respective spot beam of the antenna, and, in some examples, may include communications scheduled for respective ones of the plurality of spot beams (e.g., spot beam coverage areas).

To support multi-static synthetic aperture radar, the reception processing system may process the feed element signals (e.g., for a time duration) according to multiple beam weight sets, each corresponding to a beam coverage pattern including one or more radar image pixel beams to generate a set of beam signals. The feed element signals may represent signal energy from a reflected illumination signal (e.g., beacon signal, communication signal), or passively received signal energy (e.g., without a corresponding illumination signal). The multiple sets of beam signals obtained from processing the feed element signals may then be processed to obtain image pixel values, and the image pixel values combined to obtain an image. The processing of the feed element signals may take into account the illumination source, which may be the same as the receiver or relay of the feed element signals, or a different transmitter, in some cases. In some cases, multiple sets of feed element signals (e.g., each corresponding to a time duration) may be processed and combined to form the image.

DETAILED DESCRIPTION

Figure 1A:
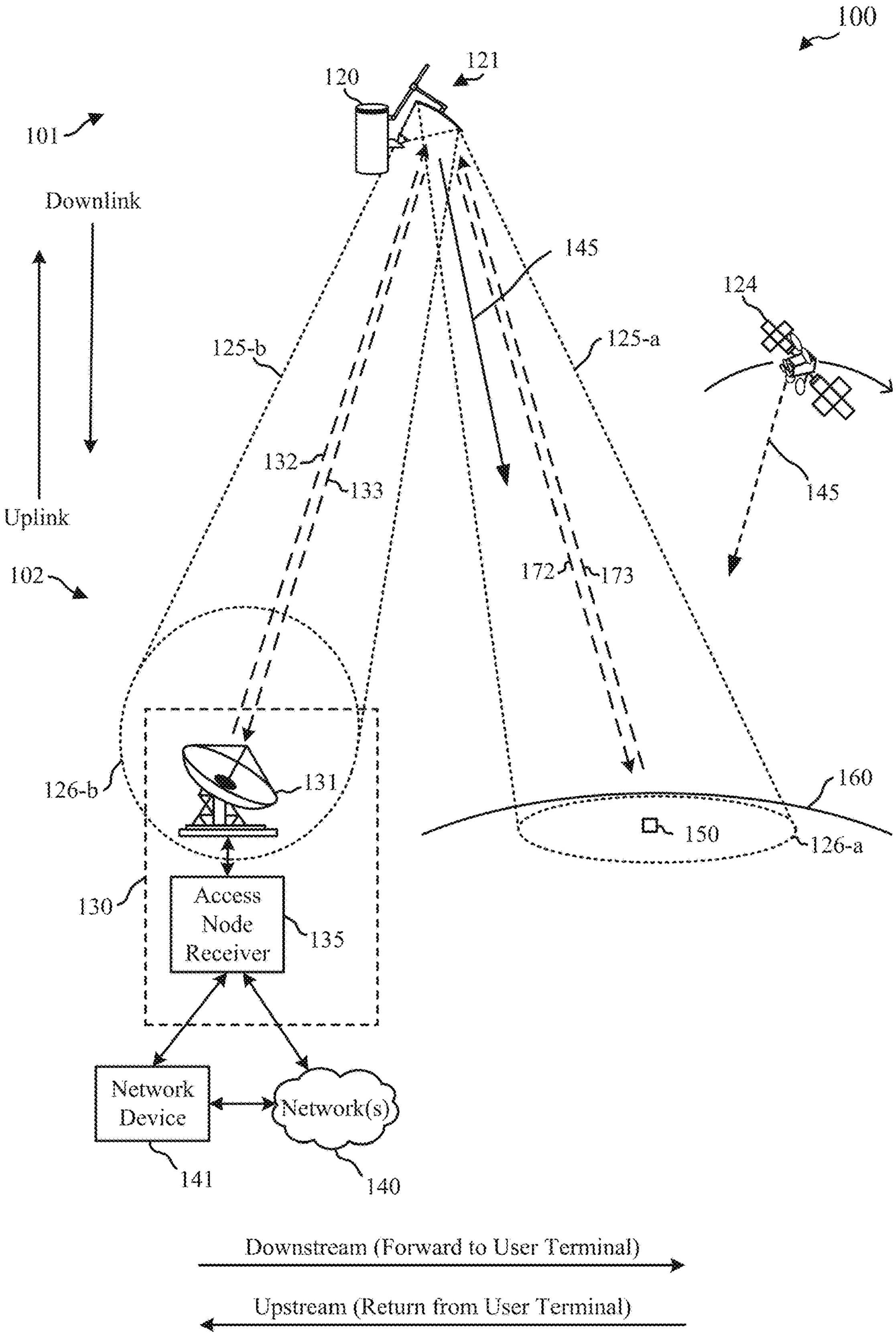
FIG. 1A shows a diagram of a communications system that supports multi-static synthetic aperture radar in accordance with examples as disclosed herein.

A system in accordance with the techniques described herein may support various examples of multi-static synthetic aperture radar. For example, a feed array antenna may be included in a vehicle such as a satellite, a plane, an unmanned aerial vehicle (UAV), or some other type of device that supports a communications service or other reception capability over a service coverage area. The antenna may include a feed array having a set of feed elements and, to support signal reception, each of the feed elements may be associated with a feed element signal corresponding to received energy at the respective feed element. Alternatively, the device may relay signals received at the feed array via a corresponding feed array (e.g., the same or a different feed array). A ground system (e.g., multiple access node terminals) may receive the relayed signals. A reception processing system may receive the signals (e.g., the feed element signals or access node terminal signals) and perform various beamforming techniques to support directional reception. Components of a reception processing system may be included in one or more ground stations, or may be included in a satellite or other vehicle that may or may not include the antenna associated with the feed element signals being processed. In some examples, components of a reception processing system may be distributed among more than one device, including components distributed between a vehicle and a ground segment.

According to various aspects described herein, multiple feed signals or access node terminal signals may be processed according to multiple beam weight sets to obtain different sets of image points within an imaged region. The feed signals or access node terminal signals may include reflections of actively transmitted signals (e.g., reflected beacon signals, reflected communication signals), or passively collected signals (e.g., emissions or reflections of other communication signals, thermal emissions, or other signals). The sets of image points may be combined to a multi-static synthetic aperture radar image.

This description provides various examples of techniques for multi-static synthetic aperture radar, and such examples are not a limitation of the scope, applicability, or configuration of examples in accordance with the principles described herein. Rather, the ensuing description will provide those skilled in the art with an enabling description for implementing embodiments of the principles described herein. Various changes may be made in the function and arrangement of elements.

Thus, various embodiments in accordance with the examples disclosed herein may omit, substitute, or add various procedures or components as appropriate. For instance, it should be appreciated that the methods may be performed in an order different than that described, and that various steps may be added, omitted or combined. Also, aspects and elements described with respect to certain examples may be combined in various other examples. It should also be appreciated that the following systems, methods, devices, and software may individually or collectively be components of a larger system, wherein other procedures may take precedence over or otherwise modify their application.

FIG. 1A shows a diagram of a satellite system 100 that supports multi-static synthetic aperture radar in accordance with examples as disclosed herein. Satellite system 100 may use a number of network architectures including a space segment 101 and ground segment 102. The space segment 101 may include one or more satellites 120. The ground segment 102 may include one or more access node terminals 130 (e.g., gateway terminals, ground stations), as well as network devices 141 such as network operations centers (NOCs) or other central processing centers or devices, and satellite and gateway terminal command centers. In some examples, the ground segment 102 may also include user terminals 150 that are provided a communications service via a satellite 120.

In various examples, a satellite 120 may be configured to support wireless communication between one or more access node terminals 130 and/or various user terminals 150 located in a service coverage area, which, in some examples, may be a primary task or mission of the satellite 120. In some examples, a satellite 120 may be configured for information collection, and may include various sensors for detecting a geographical distribution of electromagnetic, optical, thermal, or other data (e.g., in a data collection or reception mission). In some examples, the satellite 120 may be deployed in a geostationary orbit, such that its orbital position with respect to terrestrial devices is relatively fixed, or fixed within an operational tolerance or other orbital window (e.g., within an orbital slot). In other examples, the satellite 120 may operate in any appropriate orbit (e.g., low Earth orbit (LEO), medium Earth orbit (MEO), etc.).

The satellite 120 may use an antenna assembly 121, such as a phased array antenna assembly (e.g., direct radiating array (DRA)), a phased array fed reflector (PAFR) antenna, or any other mechanism known in the art for reception or transmission of signals (e.g., of a communications or broadcast service, or a data collection service). When supporting a communications service, the satellite 120 may receive forward uplink signals 132 from one or more access node terminals 130 and provide corresponding forward downlink signals 172 to one or more user terminals 150. The satellite 120 may also receive return uplink signals 173 from one or more user terminals 150 and forward corresponding return downlink signals 133 to one or more access node terminals 130. A variety of physical layer transmission modulation and coding techniques may be used by the satellite 120 for the communication of signals between access node terminals 130 or user terminals 150 (e.g., adaptive coding and modulation (ACM)).

The antenna assembly 121 may support communication or other signal reception via one or more beamformed spot beams 125, which may be otherwise referred to as service beams, satellite beams, or any other suitable terminology. Signals may be passed via the antenna assembly 121 in accordance with a spatial electromagnetic radiation pattern of the spot beams 125. When supporting a communications service, a spot beam 125 may use a single carrier, such as one frequency or a contiguous frequency range, which may also be associated with a single polarization. In some examples, a spot beam 125 may be configured to support only user terminals 150, in which case the spot beam 125 may be referred to as a user spot beam or a user beam (e.g., user spot beam 125-*a*). For example, a user spot beam 125-*a* may be configured to support one or more forward downlink signals 172 and/or one or more return uplink signals 173 between the satellite 120 and user terminals 150. In some examples, a spot beam 125 may be configured to support only access node terminals 130, in which case the spot beam 125 may be referred to as an access node spot beam, an access node beam, or a gateway beam (e.g., access node spot beam 125-*b*). For example, an access node spot beam 125-*b* may be configured to support one or more forward uplink signals 132 and/or one or more return downlink signals 133 between the satellite 120 and access node terminals 130. In other examples, a spot beam 125 may be configured to service both user terminals 150 and access node terminals 130, and thus a spot beam 125 may support any combination of forward downlink signals 172, return uplink signals 173, forward uplink signals 132, and/or return downlink signals 133 between the satellite 120 and user terminals 150 and access node terminals 130.

A spot beam 125 may support a communications service between target devices (e.g., user terminals 150 and/or access node terminals 130), or other signal reception, within a spot beam coverage area 126 (e.g., spot beam coverage area 126-*a*, spot beam coverage area 126-*b*). A spot beam coverage area 126 may be defined by an area of the electromagnetic radiation pattern of the associated spot beam 125, as projected on the ground or some other reference surface, having a signal power, signal-to-noise ratio (SNR), or signal-to-interference-plus-noise ratio (SINR) of spot beam 125 above a threshold. A spot beam coverage area 126 may cover any suitable service area (e.g., circular, elliptical, hexagonal, local, regional, national) and may support a communications service with any quantity of target devices located in the spot beam coverage area 126. In various examples, target devices such as airborne or underwater target devices may be located within a spot beam 125, but not located at the reference surface of a spot beam coverage area 126 (e.g., reference surface 160, which may be a terrestrial surface, a land surface, a surface of a body of water such as a lake or ocean, or a reference surface at an elevation or altitude).

Beamforming for a communication link may be performed by adjusting the signal phase (or time delay), and sometimes signal amplitude, of signals transmitted and/or received by multiple feed elements of one or more antenna assemblies 121 with overlapping native feed element patterns. In some examples, some or all feed elements may be arranged as an array of constituent receive and/or transmit feed elements that cooperate to enable various examples of on-board beamforming (OBBF), ground-based beamforming (GBBF), end-to-end beamforming, or other types of beamforming.

The satellite 120 may support multiple beamformed spot beams 125 covering respective spot beam coverage areas 126, each of which may or may not overlap with adjacent spot beam coverage areas 126. For example, the satellite 120 may support a service coverage area (e.g., a regional coverage area, a national coverage area, a hemispherical coverage area) formed by the combination of any number (e.g., tens, hundreds, thousands) of spot beam coverage areas 126. The satellite 120 may support a communications service by way of one or more frequency bands, and any number of subbands thereof. For example, the satellite 120 may support operations in the International Telecommunications Union (ITU) Ku, K, or Ka-bands, C-band, X-band, S-band, L-band, V-band, and the like.

In some examples, a service coverage area may be defined as a coverage area from which, and/or to which, either a terrestrial transmission source, or a terrestrial receiver may be participate in (e.g., transmit and/or receive signals associated with) a communications service via the satellite 120, and may be defined by a plurality of spot beam coverage areas 126. In some systems, the service coverage area for each communications link (e.g., a forward uplink coverage area, a forward downlink coverage area, a return uplink coverage area, and/or a return downlink coverage area) may be different. While the service coverage area may only be active when the satellite 120 is in service (e.g., in a service orbit), the satellite 120 may have (e.g., be designed or configured to have) a native antenna pattern that is based on the physical components of the antenna assembly 121, and their relative positions. A native antenna pattern of the satellite 120 may refer to a distribution of energy with respect to an antenna assembly 121 of a satellite (e.g., energy transmitted from and/or received by the antenna assembly 121).

In some service coverage areas, adjacent spot beam coverage areas 126 may have some degree of overlap. In some examples, a multi-color (e.g., two, three or four-color re-use pattern) may be used, wherein a "color" refers to a combination of orthogonal communications resources (e.g., frequency resources, polarization, etc.). In an example of a four-color pattern, overlapping spot beam coverage areas 126 may each be assigned with one of the four colors, and each color may be allocated a unique combination of frequency (e.g., a frequency range or ranges, one or more channels) and/or signal polarization (e.g., a right-hand circular polarization (RHCP), a left-hand circular polarization (LHCP), etc.), or otherwise orthogonal resources. Assigning different colors to respective spot beam coverage areas 126 that have overlapping regions may reduce or eliminate interference between the spot beams 125 associated with those overlapping spot beam coverage areas 126 (e.g., by scheduling transmissions corresponding to respective spot beams according to respective colors, by filtering transmissions corresponding to respective spot beams according to respective colors). These combinations of frequency and antenna polarization may accordingly be re-used in the repeating non-overlapping "four-color" re-use pattern. In some examples, a communication service may be provided by using more or fewer colors. Additionally or alternatively, time sharing among spot beams 125 and/or other interference mitigation techniques may be used. For example, spot beams 125 may concurrently use the same resources (the same polarization and frequency range) with interference mitigated using mitigation techniques such as ACM, interference cancellation, space-time coding, and the like.

In some examples, a satellite 120 may be configured as a "bent pipe" satellite. In a bent pipe configuration, a satellite 120 may perform frequency and polarization conversion of the received carrier signals before re-transmission of the signals to their destination. In some examples, a satellite 120 may support a non-processed bent pipe architecture, with phased array antennas used to produce relatively small spot beams 125 (e.g., by way of GBBF). A satellite 120 may support K generic pathways, each of which may be allocated as a forward pathway or a return pathway at any instant of time. Relatively large reflectors may be illuminated by a phased array of antenna feed elements, supporting an ability to make various patterns of spot beams 125 within the constraints set by the size of the reflector and the number and placement of the antenna feed elements. Phased array fed reflectors may be employed for both receiving uplink signals 132, 173, or both, and transmitting downlink signals 133, 172, or both.

A satellite 120 may operate in a multiple spot beam mode, transmitting or receiving according to a number of relatively narrow spot beams 125 directed at different regions of the earth. This may allow for segregation of user terminals 150 into the various narrow spot beams 125, or otherwise supporting a spatial separation of transmitted or received signals. In some examples, beamforming networks (BFN) associated with receive (Rx) or transmit (Tx) phased arrays may be dynamic, allowing for movement of the locations of Tx spot beams 125 (e.g., downlink spot beams 125) and Rx spot beams 125 (e.g., uplink spot beams 125).

User terminals 150 may include various devices configured to communicate signals with the satellite 120, which may include fixed terminals (e.g., ground-based stationary terminals) or mobile terminals such as terminals on boats, aircraft, ground-based vehicles, and the like. A user terminal 150 may communicate data and information via the satellite 120, which may include communications via an access node terminal 130 to a destination device such as a network device 141, or some other device or distributed server associated with a network 140. A user terminal 150 may communicate signals according to a variety of physical layer transmission modulation and coding techniques, including, for example, those defined by the Digital Video Broadcasting-Satellite-Second Generation (DVB-S2), Worldwide Interoperability for Microwave Access (WiMAX), cellular communication protocol such as Long-Term Evolution (LTE) or fifth generation (5G) protocol, or Data Over Cable Service Interface Specification (DOCSIS) standards.

An access node terminal 130 may service forward uplink signals 132 and return downlink signals 133 to and from satellite 120. Access node terminals 130 may also be known as ground stations, gateways, gateway terminals, or hubs. An access node terminal 130 may include an access node terminal antenna system 131 and an access node receiver 135. The access node terminal antenna system 131 may be two-way capable and designed with adequate transmit power and receive sensitivity to communicate reliably with the satellite 120. In some examples, access node terminal antenna system 131 may comprise a parabolic reflector with high directivity in the direction of a satellite 120 and low directivity in other directions. Access node terminal antenna system 131 may comprise a variety of alternative configurations and include operating features such as high isolation between orthogonal polarizations, high efficiency in the operational frequency bands, low noise, and the like.

When supporting a communications service, an access node terminal 130 may schedule traffic to user terminals 150. Alternatively, such scheduling may be performed in other parts of a satellite system 100 (e.g., at one or more network devices 141, which may include network operations centers (NOC) and/or gateway command centers). Although one access node terminal 130 is shown in FIG. 1A, examples in accordance with the present disclosure may be implemented in communications systems having a plurality of access node terminals 130, each of which may be coupled to each other and/or one or more networks 140.

The satellite 120 may communicate with an access node terminal 130 by transmitting return downlink signals 133 and/or receiving forward uplink signals 132 via one or more spot beams 125 (e.g., access node spot beam 125-*b*, which may be associated with a respective access node spot beam coverage area 126-*b*). Access node spot beam 125-*b* may, for example, support a communications service for one or more user terminals 150 (e.g., relayed by the satellite 120), or any other communications between the satellite 120 and the access node terminal 130.

An access node terminal 130 may provide an interface between the network 140 and the satellite 120 and, in some examples, may be configured to receive data and information directed between the network 140 and one or more user terminals 150. Access node terminal 130 may format the data and information for delivery to respective user terminals 150. Similarly, access node terminal 130 may be configured to receive signals from the satellite 120 (e.g., originating from one or more user terminals 150 and directed to a destination accessible via network 140). Access node terminal 130 may also format the received signals for transmission on network 140.

The network(s) 140 may be any type of network and can include, for example, the Internet, an internet protocol (IP) network, an intranet, a wide-area network (WAN), a metropolitan area network (MAN), a local-area network (LAN), a virtual private network (VPN), a virtual LAN (VLAN), a fiber optic network, a hybrid fiber-coax network, a cable network, a public switched telephone network (PSTN), a public switched data network (PSDN), a public land mobile network, and/or any other type of network supporting communications between devices as described herein. Network(s) 140 may include both wired and wireless connections as well as optical links. Network(s) 140 may connect the access node terminal 130 with other access node terminals that may be in communication with the same satellite 120 or with different satellites 120 or other vehicles.

One or more network device(s) 141 may be coupled with the access node terminal 130 and may control aspects of the satellite system 100. In various examples a network device 141 may be co-located or otherwise nearby the access node terminal 130, or may be a remote installation that communicates with the access node terminal 130 and/or network(s) 140 via wired and/or wireless communications link(s).

The satellite system 100 may be configured according to various techniques that support multi-static synthetic aperture radar. For example, multiple feed signals (e.g., signals received at antenna assembly 121) or access node terminal signals (e.g., signals received at access node terminal antenna system 131) may be processed according to multiple beam weight sets to obtain different sets of image points within an imaged region. In some cases, the feed signals or access node terminal signals may include reflections of actively transmitted signals. For example, satellite 120 may transmit an illumination signal 145 over one or more of the spot beam coverage areas 126. In some cases, the illumination signal 145 may be transmitted as a broad beacon signal over a region including each of the spot beam coverage areas 126. For example, the illumination signal 145 may be a beacon signal used by terminals (e.g., user terminals, access node terminals) for signal acquisition and timing synchronization. Additionally or alternatively, the illumination signal 145 may be transmitted by a different satellite or satellites. For example, the satellite 120 may be a GEO satellite, and the illumination signal 145 may be transmitted by one or more LEO satellites 124. Thus, an aperture for imaging the received signals may be defined by relative movement of the LEO satellites 124 relative to the illuminated region and GEO satellite 120.

Additionally or alternatively, the forward downlink signals 172 may be used as an illumination signal. The illumination signal 145 or forward downlink signals 172 may be reflected by terrain or objects (e.g., ground-based or airborne objects), and received in the feed signals or access node terminal signals (e.g., as ancillary signals in return uplink signals 173 or return downlink signals 132). Additionally or alternatively, the feed signals or access node terminal signals may include incidental signals (e.g., emissions or reflections of other communication signals, thermal emissions, or other signals). The sets of image points may be combined to a multi-static synthetic aperture radar image.

Figure 1B:
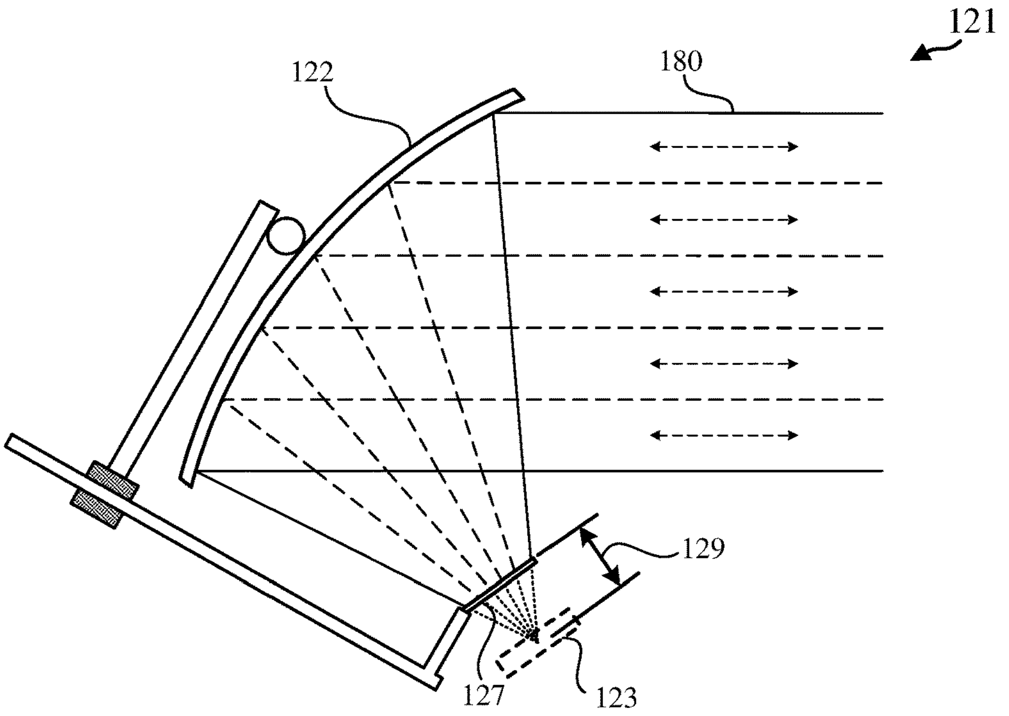
FIG. 1B illustrates an antenna assembly of a satellite that supports multi-static synthetic aperture radar in accordance with examples as disclosed herein.

FIG. 1B illustrates an antenna assembly 121 of a satellite 120 that supports multi-static synthetic aperture radar in accordance with examples as disclosed herein. As shown in FIG. 1B, the antenna assembly 121 may include a feed array assembly 127 and a reflector 122 that is shaped to have a focal region 123 where electromagnetic signals (e.g., inbound electromagnetic signals 180) are concentrated when received from a distant source. Similarly, a signal emitted by a feed array assembly 127 located at the focal region 123 will be reflected by reflector 122 into an outgoing plane wave (e.g., outbound electromagnetic signals 180). The feed array assembly 127 and the reflector 122 may be associated with a native antenna pattern formed by the composite of native feed element patterns for each of a plurality of feed elements 128 of the feed array assembly 127.

A satellite 120 may operate according to native antenna pattern of the antenna assembly 121 when the satellite 120 is in a service orbit, as described herein. The native antenna pattern may be based at least in part on a pattern of feed elements 128 of a feed array assembly 127, a relative position (e.g., a focal offset distance 129, or lack thereof in a focused position) of a feed array assembly 127 with respect to a reflector 122, etc. The native antenna pattern may be associated with a native antenna pattern coverage area. Antenna assemblies 121 described herein may be designed to support a particular service coverage area with the native antenna pattern coverage area of an antenna assembly 121, and various design characteristics may be determined computationally (e.g., by analysis or simulation) and/or measured experimentally (e.g., on an antenna test range or in actual use).

As shown in FIG. 1B, the feed array assembly 127 of the antenna assembly 121 is located between the reflector 122 and the focal region 123 of the reflector 122. Specifically, the feed array assembly 127 is located at a focal offset distance 129 from the focal region 123. Accordingly, the feed array assembly 127 of the antenna assembly 121 may be located at a defocused position with respect to the reflector 122. Although illustrated in FIG. 1B as a direct offset feed array assembly 127, a front feed array assembly 127 may be used, as well as other types of configurations, including the use of a secondary reflector (e.g., Cassegrain antenna, etc.), or a configuration without a reflector 122 (e.g., a DRA).

Figure 1C:
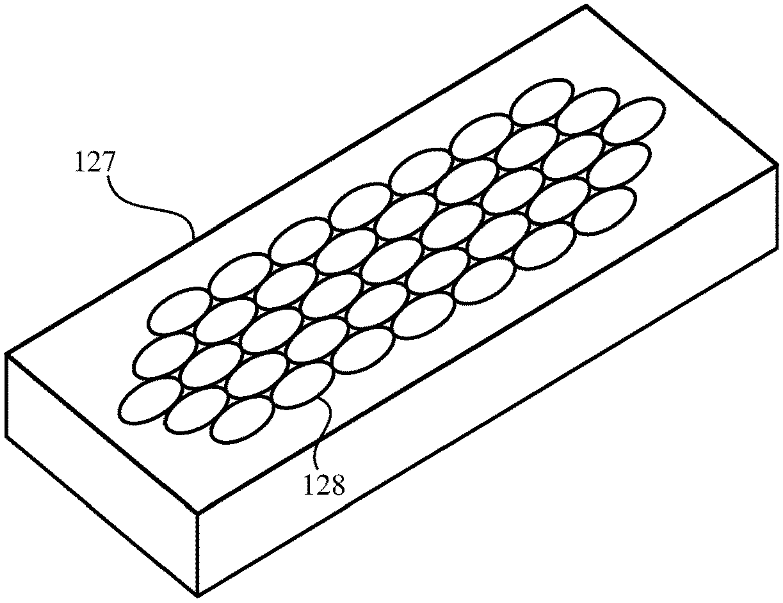
FIG. 1C illustrates a feed array assembly of an antenna assembly that supports multi-static synthetic aperture radar in accordance with examples as disclosed herein.

FIG. 1C illustrates a feed array assembly 127 of an antenna assembly 121 that supports multi-static synthetic aperture radar in accordance with examples as disclosed herein. As shown in FIG. 1C, the feed array assembly 127 may have multiple feed elements 128 for communicating signals (e.g., signals associated with a communications service, signals associated with a configuration or control of the satellite 120, received signals of a data collection or sensor arrangement).

As used herein, a feed element 128 may refer to a receive antenna element, a transmit antenna element, or an antenna element configured to support both transmitting and receiving (e.g., a transceiver element). A receive antenna element may include a physical transducer (e.g., a radio frequency (RF) transducer) that converts an electromagnetic signal to an electrical signal, and a transmit antenna element may include a physical transducer that emits an electromagnetic signal when excited by an electrical signal. The same physical transducer may be used for transmitting and receiving, in some cases.

Each of the feed elements 128 may include, for example, a feed horn, a polarization transducer (e.g., a septum polarized horn, which may function as two combined elements with different polarizations), a multi-port multi-band horn (e.g., dual-band 20 GHz/30 GHz with dual polarization LHCP/RHCP), a cavity-backed slot, an inverted-F, a slotted waveguide, a Vivaldi, a Helical, a loop, a patch, or any other configuration of an antenna element or combination of interconnected sub-elements. Each of the feed elements 128 may also include, or be otherwise coupled with an RF signal transducer, a low noise amplifier (LNA), or power amplifier (PA), and may be coupled with transponders in the satellite 120 that may perform other signal processing such as frequency conversion, beamforming processing, and the like.

A reflector 122 may be configured to reflect signals between the feed array assembly 127 and one or more target devices (e.g., user terminals 150, access node terminals 130) or objects (e.g., terrain features, vehicles, buildings, airborne objects). Each feed element 128 of the feed array assembly 127 may be associated with a respective native feed element pattern, which may be associated with a projected native feed element pattern coverage area (e.g., as projected on a terrestrial surface, plane, or volume after reflection from the reflector 122). The collection of the native feed element pattern coverage areas for a multi-feed antenna may be referred to as a native antenna pattern. A feed array assembly 127 may include any number of feed elements 128 (e.g., tens, hundreds, thousands, etc.), which may be arranged in any suitable arrangement (e.g., a linear array, an arcuate array, a planar array, a honeycomb array, a polyhedral array, a spherical array, an ellipsoidal array, or combinations thereof). Feed elements 128 may have ports or apertures having various shapes such as circular, elliptical, square, rectangular, hexagonal, and others.

FIGS. 2A through 2D illustrate examples of antenna characteristics for an antenna assembly 121-*a* having a feed array assembly 127-*a* that supports multi-static synthetic aperture radar in accordance with examples as disclosed herein. The antenna assembly 121-*a* may be operating in a condition that spreads received transmissions from a given location to a plurality of feed elements 128-*a*, or spreads transmitted power from a feed element 128-*a* over a relatively large area, or both.

Figure 2A:
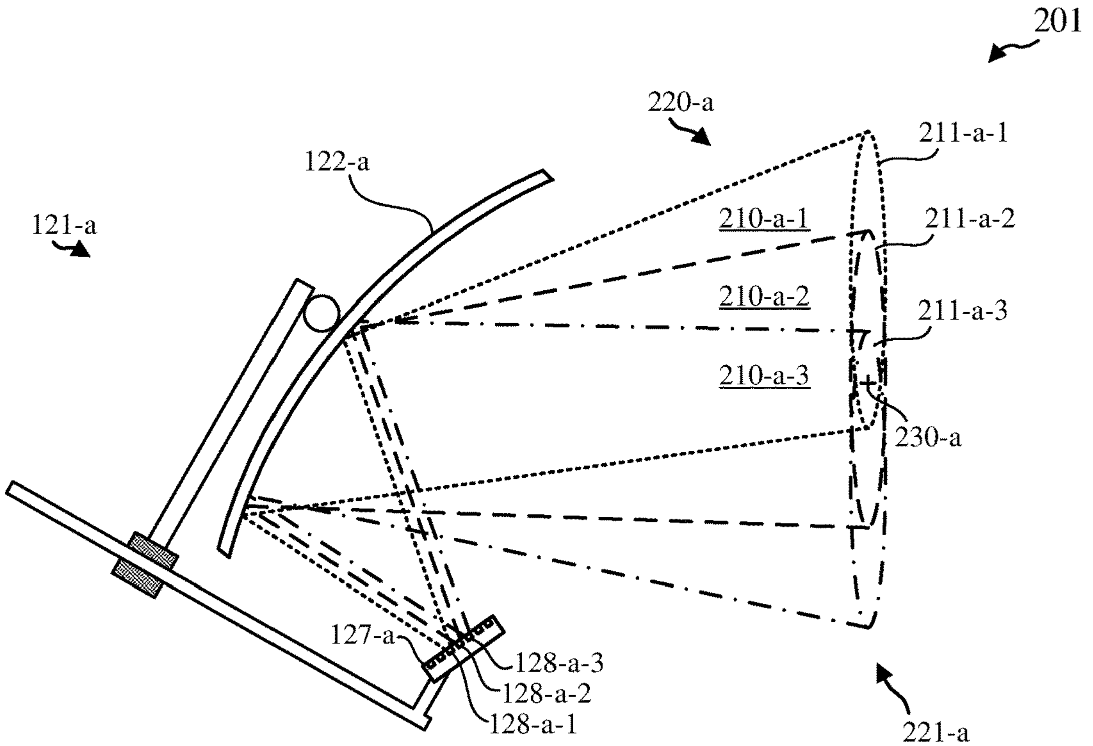
FIGS. 2A through 2D illustrate examples of antenna characteristics for an antenna assembly having a feed array assembly that supports multi-static synthetic aperture radar in accordance with examples as disclosed herein.

FIG. 2A shows a diagram 201 of native feed element patterns 210-*a* associated with feed elements 128-*a* of the feed array assembly 127-*a*. Specifically, diagram 201 illustrates native feed element patterns 210-*a*-1, 210-*a*-2, and 210-*a*-3, associated with feed elements 128-*a*-1, 128-*a*-2, and 128-*a*-3, respectively. The native feed element patterns 210-*a* may represent the spatial radiation pattern associated with each of the respective feed elements 128. For example, when feed element 128-*a*-2 is transmitting, transmitted electromagnetic signals may be reflected off the reflector 122-*a*, and propagate in a generally conical native feed element pattern 210-*a*-2 (although other shapes are possible depending on the characteristics of a feed element 128 and/or reflector 122). Although three native feed element patterns 210-*a* are shown for the antenna assembly 121-*a*, each of the feed elements 128 of an antenna assembly 121 is associated with a respective native feed element pattern 210. The composite of the native feed element patterns 210-*a* associated with the antenna assembly 121-*a* (e.g., native feed element patterns 210-*a*-1, 210-*a*-2, 210-*a*-2, and other native feed element patterns 210-*a* that are not illustrated) may be referred to as the native antenna pattern 220-*a*.

Each of the feed elements 128-*a* may also be associated with a native feed element pattern coverage area 211-*a* (e.g., native feed element pattern coverage areas 211-*a*-1, 211-*a*-2, and 211-*a*-3, associated with feed elements 128-*a*-1, 128-*a*-2, and 128-*a*-3, respectively), representing the projection of the native feed element patterns 210-*a* on a reference surface (e.g., a ground or water surface, a reference surface at an elevation, or some other reference plane or surface). A native feed element pattern coverage area 211 may represent an area in which various devices (e.g., access node terminals 130 and/or user terminals 150) may receive signals transmitted by a respective feed element 128. Additionally or alternatively, a native feed element pattern coverage area 211 may represent an area in which transmissions from various devices may be received by a respective feed element 128. For example, a device located at an area of interest 230-*a*, located within the native feed element pattern coverage areas 211-*a*-1, 211-*a*-2, and 211-*a*-3, may receive signals transmitted by feed elements 128-*a*-1, 128-*a*-2, and 128-*a*-3 and may have transmissions received by feed elements 128-*a*-1, 128-*a*-2, and 128-3-*a*. The composite of the native feed element pattern coverage areas 211-*a* associated with the antenna assembly 121-*a* (e.g., native feed element pattern coverage areas 211-*a*-1, 211-*a*-2, 211-*a*-2, and other native feed element pattern coverage areas 211-*a* that are not illustrated) may be referred to as the native antenna pattern coverage area 221-*a*.

The feed array assembly 127-*a* may be operating at a defocused position with respect to the reflector 122-*a*, such that the native feed element patterns 210-*a*, and thus the native feed element pattern coverage areas 211-*a*, are substantially overlapping. Therefore each position in the native antenna pattern coverage area 221-*a* may be associated with a plurality of feed elements 128, such that transmissions to a point of interest or receptions from a point of interest may employ a plurality of feed elements 128. It should be understood that diagram 201 is not drawn to scale and that native feed element pattern coverage areas 211 are generally each much larger than the reflector 122-*a*.

Figure 2B:
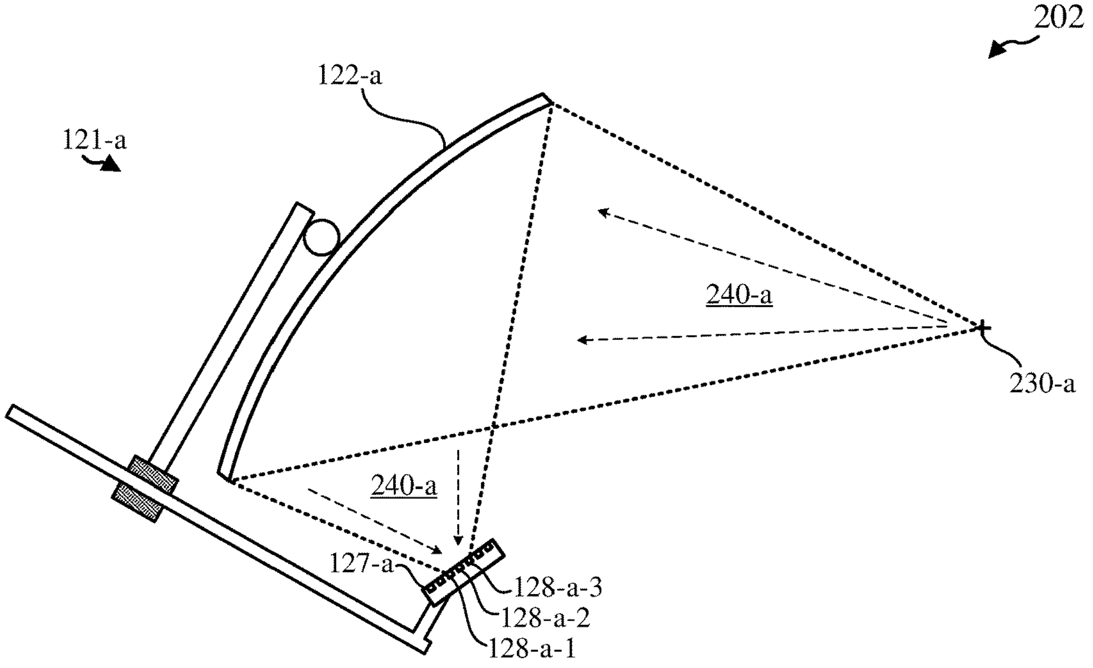

FIG. 2B shows a diagram 202 illustrating signal reception of the antenna assembly 121-*a* for transmissions 240-*a* from the point of interest 230-*a*. Transmissions 240-*a* from the point of interest 230-*a* may illuminate the entire reflector 122-*a*, or some portion of the reflector 122-*a*, and then be focused and directed toward the feed array assembly 127-*a* according to the shape of the reflector 122-*a* and the angle of incidence of the transmission 240 on the reflector 122-*a*. The feed array assembly 127-*a* may be operating at a defocused position with respect to the reflector 122-*a*, such that a transmission 240-*a* may be focused on a plurality of feed elements 128 (e.g., feed elements 128-*a*-1, 128-*a*-2, and 128-*a*-3, associated with the native feed element pattern coverage areas 211-*a*-1, 211-*a*-2, and 211-*a*-3, each of which contain the point of interest 230-*b*).

Figure 2C:
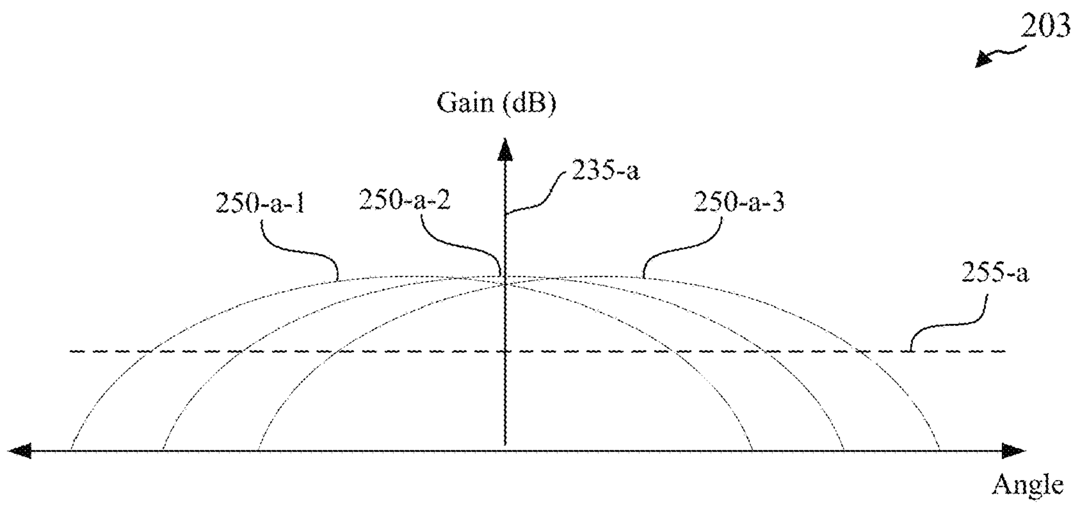

FIG. 2C shows a diagram 203 of native feed element pattern gain profiles 250-*a* associated with three feed elements 128-*a* of the feed array assembly 127-*a*, with reference to angles measured from a zero offset angle 235-*a*. For example, native feed element pattern gain profiles 250-*a*-1, 250-*a*-2, and 250-*a*-3 may be associated with feed elements 128-*a*-1, 128-*a*-2, and 128-*a*-3, respectively, and therefore may represent the gain profiles of native feed element patterns 210-*a*-1, 210-*a*-2, and 210-*a*-3. As shown in diagram 203, the gain of each native feed element pattern gain profile 250 may attenuate at angles offset in either direction from the peak gain. In diagram 203, beam contour level 255-*a* may represent a desired gain level (e.g., to provide a desired information rate) to support a communications service or other reception or transmission service via the antenna assembly 121-*a*, which therefore may be used to define a boundary of respective native feed element pattern coverage areas 211-*a* (e.g., native feed element pattern coverage areas 211-*a*-1, 211-*a*-2, and 211-*a*-3). Beam contour level 255-*a* may represent, for example, a −1 dB, −2 dB, or −3 dB attenuation from the peak gain, or may be defined by an absolute signal strength, SNR level, or SINR level. Although three native feed element pattern gain profiles 250-*a* are shown, other native feed element pattern gain profiles 250-*a* may be associated with other feed elements 128-*a*.

As shown in diagram 203, each of the native feed element pattern gain profiles 250-*a* may intersect with another native feed element pattern gain profile 250-*a* for a substantial portion of the gain profile above the beam contour level 255-*a*. Accordingly, diagram 203 illustrates an arrangement of native feed element pattern gain profiles 250 where multiple feed elements 128 of a feed array assembly 127 may support signal communication at a particular angle (e.g., at a particular direction of the native antenna pattern 220-*a*). In some examples, this condition may be referred to as having feed elements 128 of a feed array assembly 127, or native feed element pattern coverage areas 211, having a high degree of overlap.

Figure 2D:
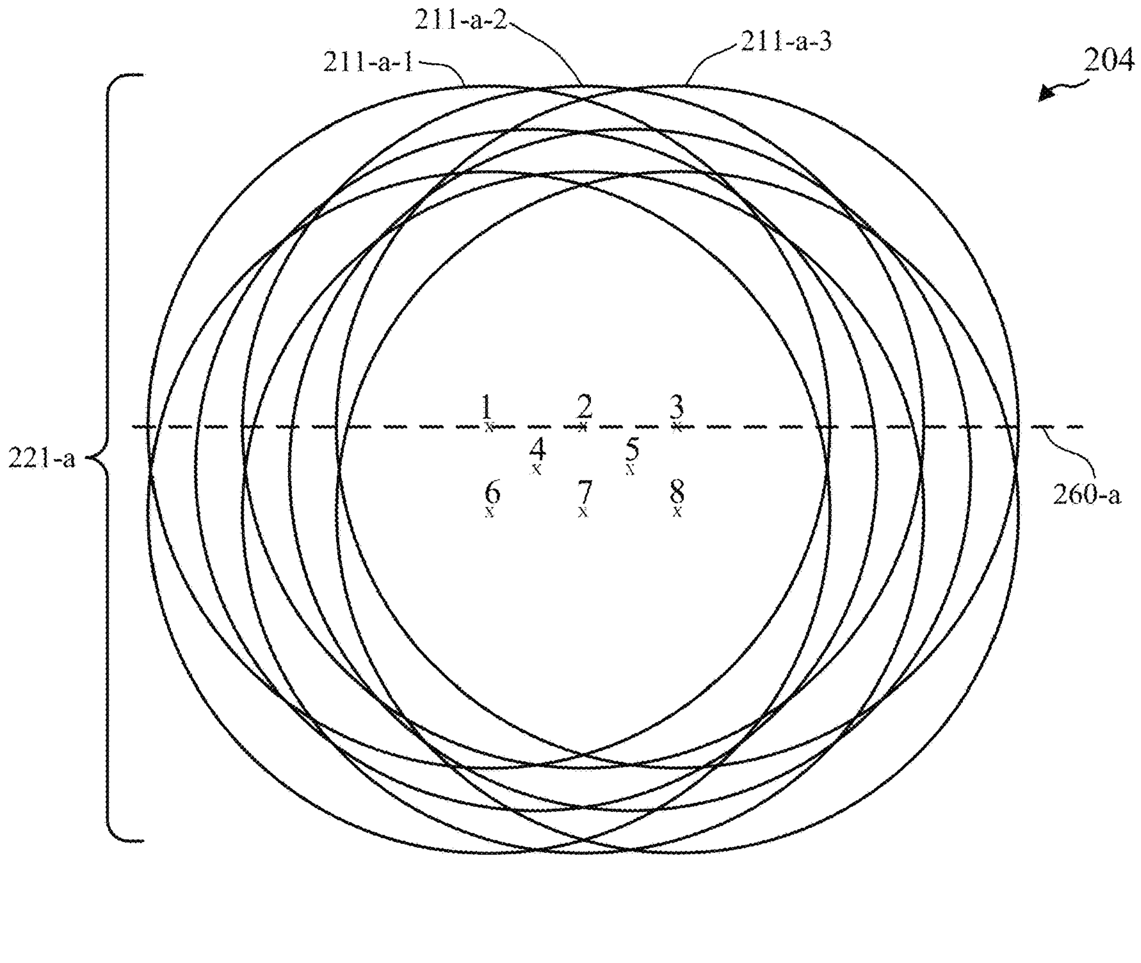

FIG. 2D shows a diagram 204 illustrating a two-dimensional array of idealized native feed element pattern coverage areas 211 of several feed elements 128 of the feed array assembly 127-*a* (e.g., including feed elements 128-*a*-1, 128-*a*-2, and 128-*a*-3). The native feed element pattern coverage areas 211 may be illustrated with respect to reference surface (e.g., a plane at a distance from the communications satellite, a plane at some distance from the ground, a spherical surface at some elevation, a ground surface, etc.), and may additionally include a volume adjacent to the reference surface (e.g., a substantially conical volume between the reference surface and the communications satellite, a volume below the reference surface, etc.). The multiple native feed element pattern coverage areas 211-*a* may collectively form the native antenna pattern coverage area 221-*a*. Although eight native feed element pattern coverage areas 211-*a* are illustrated, a feed array assembly 127 may have any quantity of feed elements 128 (e.g., fewer than eight or more than eight), each associated with a native feed element pattern coverage area 211.

The boundaries of each native feed element pattern coverage area 211 may correspond to the respective native feed element pattern 210 at the beam contour level 255-*a*, and the peak gain of each native feed element pattern coverage area 211 may have a location designated with an 'x' (e.g., a nominal alignment or axis of a respective native feed element pattern 210 or native feed element pattern coverage area 211). Native feed element pattern coverage areas 211 *a*-1, 211-*a*-2, and 211-*a*-3 may correspond to the projection of the native feed element patterns associated with native feed element pattern gain profiles 250-*a*-1, 250-*a*-2, and 250-*a*-3, respectively, where diagram 203 illustrates the native feed element pattern gain profiles 250 along section plane 260-*a* of diagram 204.

The native feed element pattern coverage areas 211 are referred to herein as idealized because the coverage areas are shown as circular for the sake of simplicity. However, in various examples a native feed element pattern coverage area 211 may be some shape other than a circle (e.g., an ellipse, a hexagon, a rectangle, etc.). Thus, tiled native feed element pattern coverage areas 211 may have more overlap with each other (e.g., more than three native feed element pattern coverage areas 211 may overlap, in some cases) than shown in diagram 204.

In diagram 204, which may represent a condition where the feed array assembly 127-*a* is located at a defocused position with respect to the reflector 122-*a*, a substantial portion (e.g., a majority) of each native feed element pattern coverage area 211 overlaps with an adjacent native feed element pattern coverage area 211. Locations within a service coverage area (e.g., a total coverage area of a plurality of spot beams of an antenna assembly 121) may be located within the native feed element pattern coverage area 211 of two or more feed elements 128. For example, the antenna assembly 121-*a* may be configured such that the area where more than two native feed element pattern coverage areas 211 overlap is maximized. In some examples, this condition may also be referred to as having feed elements 128 of a feed array assembly 127, or native feed element pattern coverage areas 211, having a high degree of overlap. Although eight native feed element pattern coverage areas 211 are illustrated, a feed array assembly 127 may have any quantity of feed elements 128, associated with native feed element pattern coverage areas 211 in a like manner.

In some cases, a single antenna assembly 121 may be used for transmitting and receiving signals between user terminals 150 or access node terminals 130. In other examples, a satellite 120 may include separate antenna assemblies 121 for receiving signals and transmitting signals. A receive antenna assembly 121 of a satellite 120 may be pointed at a same or similar service coverage area as a transmit antenna assembly 121 of the satellite 120. Thus, some native feed element pattern coverage areas 211 for antenna feed elements 128 configured for reception may naturally correspond to native feed element pattern coverage areas 211 for feed elements 128 configured for transmission. In these cases, the receive feed elements 128 may be mapped in a manner similar to their corresponding transmit feed elements 128 (e.g., with similar array patterns of different feed array assemblies 127, with similar wiring and/or circuit connections to signal processing hardware, similar software configurations and/or algorithms, etc.), yielding similar signal paths and processing for transmit and receive native feed element pattern coverage areas 211. In some cases, however, it may be advantageous to map receive feed elements 128 and transmit feed elements 128 in dissimilar manners.

A plurality of native feed element patterns 210 with a high degree of overlap may be combined by way of beamforming to provide one or more spot beams 125. Beamforming for a spot beam 125 may be performed by adjusting the signal phase or time delay, and/or signal amplitude, of signals transmitted and/or received by multiple feed elements 128 of one or more feed array assemblies 127 having overlapping native feed element pattern coverage areas 211. Such phase and/or amplitude adjustment may be referred to as applying beam weights (e.g., beamforming coefficients) to the feed element signals. For transmissions (e.g., from transmitting feed elements 128 of a feed array assembly 127), the relative phases, and sometimes amplitudes, of the signals to be transmitted are adjusted, so that the energy transmitted by feed elements 128 will constructively superpose at a desired location (e.g., at a location of a spot beam coverage area 126). For reception (e.g., by receiving feed elements 128 of a feed array assembly 127, etc.), the relative phases, and sometimes amplitudes, of the received signals are adjusted (e.g., by applying the same or different beam weights) so that the energy received from a desired location (e.g., at a location of a spot beam coverage area 126) by feed elements 128 will constructively superpose for a given spot beam coverage area 126.

The term beamforming may be used to refer to the application of the beam weights, whether for transmission, reception, or both. Computing beam weights or coefficients may involve direct or indirect discovery of communication channel characteristics. The processes of beam weight computation and beam weight application may be performed in the same or different system components. Adaptive beamformers may include a functionality that supports dynamically computing beam weights or coefficients.

Spot beams 125 may be steered, selectively formed, and/or otherwise reconfigured by applying different beam weights. For example, a quantity of active native feed element patterns 210 or spot beam coverage areas 126, a size of shape of spot beams 125, relative gain of native feed element patterns 210 and/or spot beams 125, and other parameters may be varied over time. Antenna assemblies 121 may apply beamforming to form relatively narrow spot beams 125, and may be able to form spot beams 125 having improved gain characteristics. Narrow spot beams 125 may allow the signals transmitted on one beam to be distinguished from signals transmitted on other spot beams 125 to avoid interference between transmitted or received signals, or to identify spatial separation of received signals, for example.

In some examples, narrow spot beams 125 may allow frequency and polarization to be re-used to a greater extent than when larger spot beams 125 are formed. For example, spot beams 125 that are narrowly formed may support signal communication via non-contiguous spot beam coverage areas 126 that are non-overlapping, while overlapping spot beams 125 can be made orthogonal in frequency, polarization, or time. In some examples, greater reuse by use of smaller spot beams 125 can increase the amount of data transmitted and/or received. Additionally or alternatively, beamforming may be used to provide sharper gain rolloff at the beam edge which may allow for higher beam gain through a larger portion of a spot beam 125. Thus, beamforming techniques may be able to provide higher frequency reuse and/or greater system capacity for a given amount of system bandwidth.

Some satellites 120 may use OBBF to electronically steer signals transmitted and/or received via an array of feed elements 128 (e.g., applying beam weights to feed element signals at a satellite 120). For example, a satellite 120 may have a phased array multi-feed per beam (MFPB) on-board beamforming capability. In some examples, beam weights may be computed at a ground-based computation center (e.g., at an access node terminal 130, at a network device 141, at a communications service manager) and then transmitted to the satellite 120. In some examples, beam weights may be pre-configured or otherwise determined at a satellite 120 for on-board application.

In some cases, significant processing capability may be involved at a satellite 120 to control the phase and gain of each feed element 128 that is used to form spot beams 125. Such processing power may increase the complexity of a satellite 120. Thus, in some cases, a satellite 120 may operate with GBBF to reduce the complexity of the satellite 120 while still providing the advantage of electronically forming narrow spot beams 125. In some examples, beam weights or coefficients may be applied at a ground segment 102 (e.g., at one or more ground stations) before transmitting relevant signaling to the satellite 120, which may include multiplexing feed element signals at the ground segment 102 according to various time, frequency, or spatial multiplexing techniques, among other signal processing. The satellite 120 may accordingly receive and, in some cases, demultiplex such signaling, and transmit associated feed element signals via respective antenna feed elements 128 to form transmit spot beams 125 that are based at least in part on the beam weights applied at the ground segment 102. In some examples, a satellite 120 may receive feed element signals via respective antenna feed elements 128, and transmit the received feed element signals to a ground segment 102 (e.g., one or more ground stations), which may include multiplexing feed element signals at the satellite 120 according to various time, frequency, or spatial multiplexing techniques, among other signal processing. The ground segment 102 may accordingly receive and, in some cases, demultiplex such signaling, and apply beam weights to the received feed element signals to generate spot beam signals corresponding to respective spot beams 125.

In another example, a satellite system 100 in accordance with the present disclosure may support various end-to-end beamforming techniques, which may be associated with forming end-to-end spot beams 125 via a satellite 120 or other vehicle operating as an end-to-end relay. For example, satellite 120 may include multiple receive/transmit signal paths (e.g., transponders), each coupled between a receive feed element and a transmit feed element. In an end-to-end beamforming system, beam weights may be computed at a central processing system (CPS) of a ground segment 102, and end-to-end beam weights may be applied within the ground segment 102, rather than at a satellite 120. The signals within the end-to-end spot beams 125 may be transmitted and received at an array of access nodes terminals 130, which may be satellite access nodes (SANs). Any suitable type of end-to-end relay can be used in an end-to-end beamforming system, and different types of access node terminals 130 may be used to communicate with different types of end-to-end relays.

An end-to-end beamformer within a CPS may compute one set of end-to-end beam weights that accounts for: (1) the wireless signal uplink paths up to the end-to-end relay; (2) the receive/transmit signal paths through the end-to-end relay; and (3) the wireless signal downlink paths down from the end-to-end relay. The beam weights can be represented mathematically as a matrix. In some examples, OBBF and GBBF satellite systems may have beam weight vector dimensions set by the number of feed elements 128 on an antenna assembly 121. In contrast, end-to-end beam weight vectors may have dimensions set by the number of access node terminals 130, not the number of feed elements 128 on the end-to-end relay. In general, the number of access node terminals 130 is not the same as the number of feed elements 128 on the end-to-end relay. Further, the formed end-to-end spot beams 125 are not terminated at either transmit or receive feed elements 128 of the end-to-end relay. Rather, the formed end-to-end spot beams 125 may be effectively relayed, since the end-to-end spot beams 125 may have uplink signal paths, relay signal paths (via a satellite 120 or other suitable end-to-end relay), and downlink signal paths.

Because an end-to-end beamforming system may take into account both a user link and a feeder link, as well as an end-to-end relay, only a single set of beam weights is needed to form the desired end-to-end spot beams 125 in a particular direction (e.g., forward spot beams 125 or return spot beams 125). Thus, one set of end-to-end forward beam weights results in the signals transmitted from the access node terminals 130, through the forward uplink, through the end-to-end relay, and through the forward downlink to combine to form the end-to-end forward spot beams 125. Conversely, signals transmitted from return users through the return uplink, through the end-to-end relay, and the return downlink have end-to-end return beam weights applied to form the end-to-end return spot beams 125. Under some conditions, it may be difficult or impossible to distinguish between the characteristics of the uplink and the downlink. Accordingly, formed feeder link spot beams 125, formed spot beam directivity, and individual uplink and downlink carrier to interference ratio (C/I) may no longer have their traditional role in the system design, while concepts of uplink and downlink signal-to-noise ratio (Es/No) and end-to-end C/I may still be relevant.

Figure 3A:
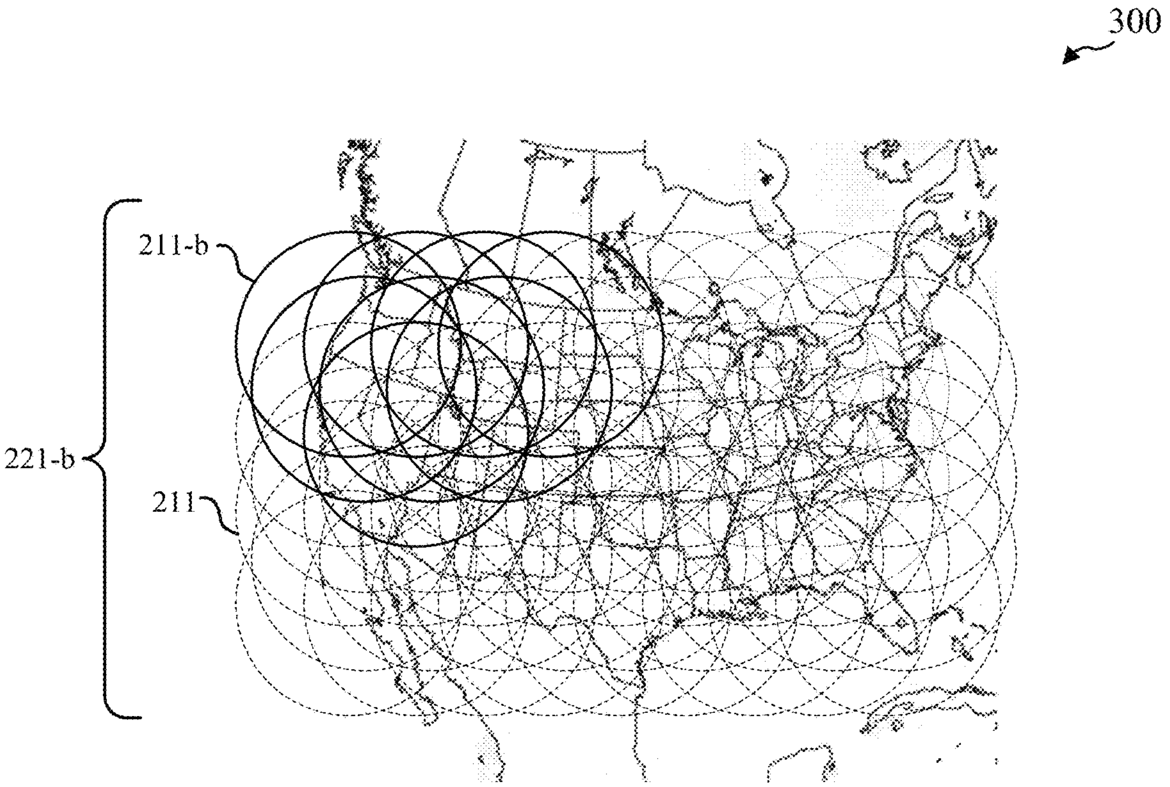
FIGS. 3A and 3B illustrate an example of beamforming to form spot beam coverage areas over a native antenna pattern coverage area in accordance with examples as disclosed herein.
Figure 3B:
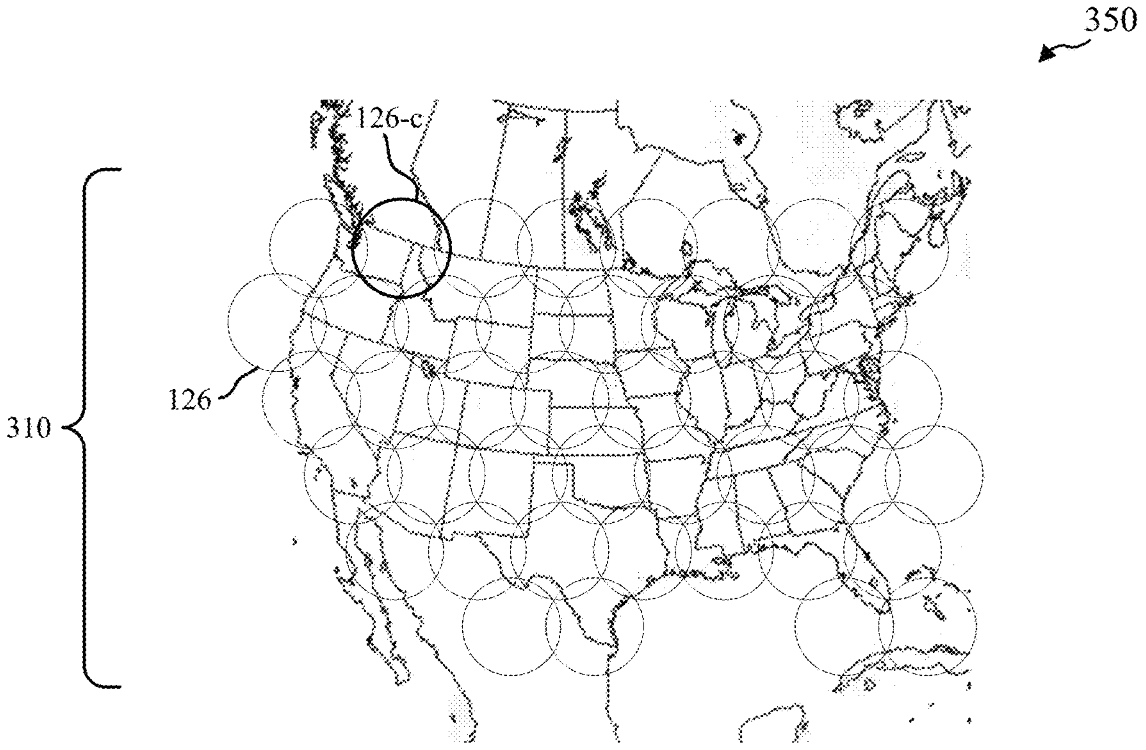

FIGS. 3A and 3B illustrate an example of beamforming to form spot beam coverage areas 126 over a native antenna pattern coverage area 221-*b* in accordance with examples as disclosed herein. In FIG. 3A, diagram 300 illustrates native antenna pattern coverage area 221-*b* that includes multiple native feed element pattern coverage areas 211 that may be provided by a defocused multi-feed antenna assembly 121. Each of the native feed element pattern coverage areas 211 may be associated with a respective feed element 128 of a feed array assembly 127 of the antenna assembly 121. In FIG. 3B, diagram 350 shows a pattern of spot beam coverage areas 126 over a service coverage area 310 of the continental United States. The spot beam coverage areas 126 may be provided by applying beamforming coefficients to signals carried via the feed elements 128 associated with the multiple native feed element pattern coverage areas 211 of FIG. 3A.

Each of the spot beam coverage areas 126 may have an associated spot beam 125 which, in some examples, may be based on a predetermined beamforming configuration configured to support a communications service or other primary or real-time mission within the respective spot beam coverage areas 126. Each of the spot beams 125 may be formed from a composite of signals carried via multiple feed elements 128 for those native feed element pattern coverage areas 211 that include the respective spot beam coverage area 126. For example, a spot beam 125 associated with spot beam coverage area 126-*c* shown in FIG. 3B may be a composite of signals via the eight feed elements 128 associated with the native feed element pattern coverage areas 211-*b* shown with dark solid lines in FIG. 3A. In various examples, spot beams 125 with overlapping spot beam coverage areas 126 may be orthogonal in frequency, polarization, and/or time, while non-overlapping spot beams 125 may be non-orthogonal to each other (e.g., a tiled frequency reuse pattern). In other examples, non-orthogonal spot beams 125 may have varying degrees of overlap, with interference mitigation techniques such as ACM, interference cancellation, or space-time coding used to manage inter-beam interference.

Beamforming may be applied to signals transmitted or received via the satellite using OBBF, GBBF, or end-to-end beamforming receive/transmit signal paths. Thus, the service provided over the spot beam coverage areas 126 illustrated in FIG. 3B may be based on the native antenna pattern coverage area 221-*b* of the antenna assembly 121 as well as beam weights applied. Although service coverage area 310 is illustrated as being provided via a substantially uniform pattern of spot beam coverage areas 126 (e.g., having equal or substantially equal beam coverage area sizes and amounts of overlap), in some examples spot beam coverage areas 126 for a service coverage area 310 may be non-uniform. For example, areas with higher population density may be provided a communications service using relatively smaller spot beams 125 while areas with lower population density may be provided the communications service using relatively larger spot beams 125.

A satellite system in accordance with examples as disclosed herein may employ various beamforming techniques to support multi-static synthetic aperture radar. For example, multiple feed signals (e.g., signals received at feed elements 128) or access node terminal signals (e.g., signals received at access node terminal antenna system 131) may be processed according to multiple beam weight sets to obtain different sets of image points within an imaged region (e.g., within a native antenna pattern coverage area 221). The feed signals or access node terminal signals may include reflections of actively transmitted signals or passively collected signals. The sets of image points may be combined to obtain a multi-static synthetic aperture radar image.

Figure 4:
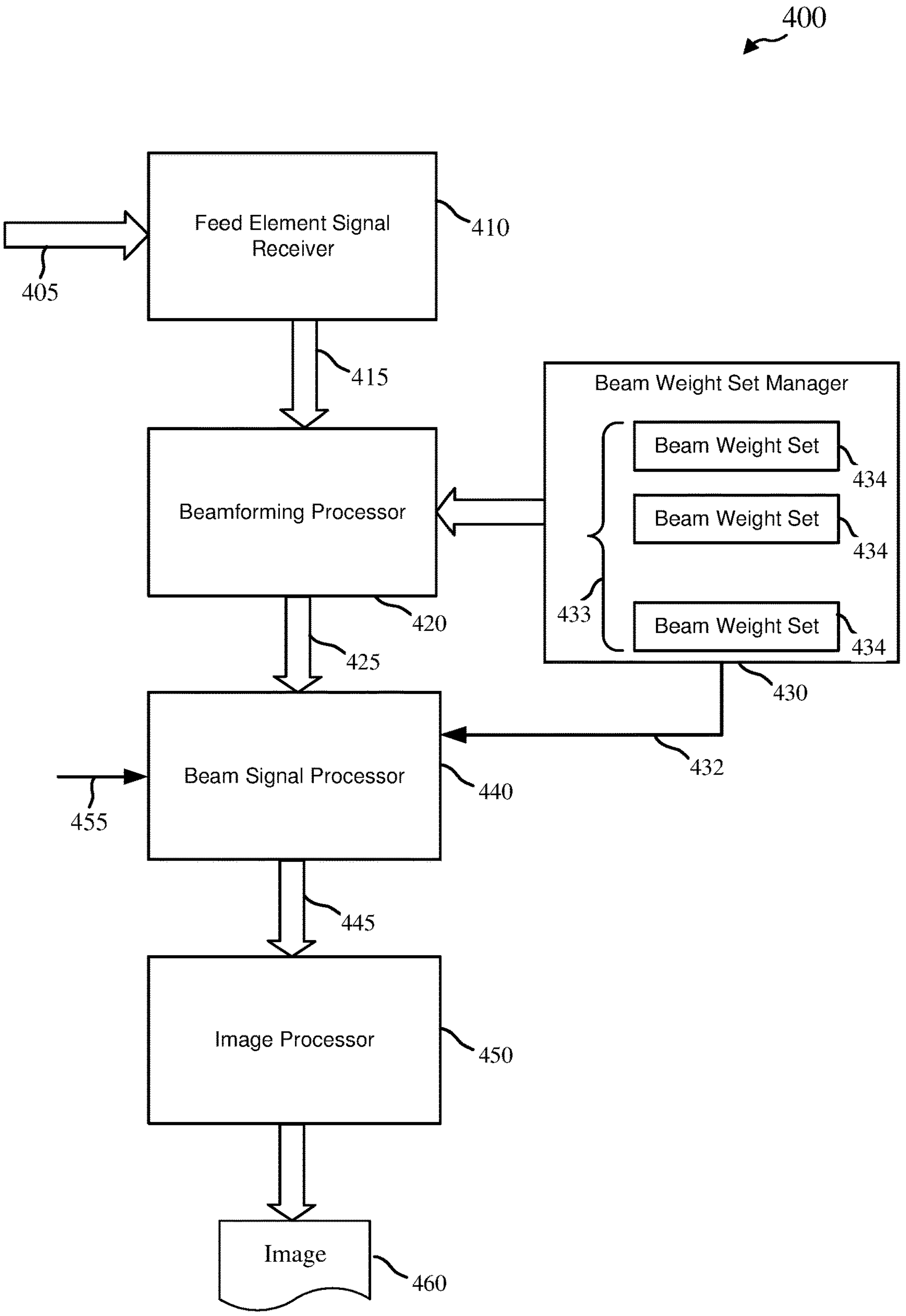
FIG. 4 illustrates an example of a reception processing system that supports multi-static synthetic aperture radar in accordance with examples as disclosed herein.

FIG. 4 illustrates an example of a reception processing system 400 that supports multi-static synthetic aperture radar in accordance with examples as disclosed herein. The example reception processing system 400 includes feed element signal receiver 410, beamforming processor 420, beam weight set manager 430, beam signal processor 440, and image processor 450.

The feed element signal receiver 410 may be configured to receive feed element signals 405 associated with an antenna assembly 121 having a feed array assembly 127. In some examples, the feed element signal receiver 410 may refer to a component of a satellite 120, or other vehicle including such an antenna assembly 121, that is coupled with the antenna assembly. For example, the satellite 120 may support OBBF, and may perform beamforming for received signals and sending of beam signals to a ground segment.

In some examples, such as a GBBF system, the feed element signal receiver 410 may refer to a component of a ground segment 102 that is separate from a device that includes such an antenna assembly 121, but is in communication with such a device (e.g., via a wireless communications link, such as a return link 133) to support the receiving of feed element signals 405. For example, the feed element signal receiver 410 may refer to a return channel feeder link downconverter of a ground segment 102, which may be a component configured to receive feed element signals 405 or other signaling for constructing receive spot beams 125 from one or more satellites 120. In some examples, the feed element signal receiver 410 may receive feed element signals by way of return links 133 via one or more ground stations, and the feed element signals 405 may be multiplexed according to various techniques, such as frequency division multiplexing, time division multiplexing, polarization multiplexing, spatial multiplexing, or other techniques. Accordingly, the feed element signal receiver 410 may be configured to demultiplex or demodulate various signaling to receive or process the feed element signals 405.

In some examples, feed element signals 405 may be received as raw signals from transducers of respective feed elements 128. In some examples, feed element signals 405 may be received as filtered or otherwise processed signals, which may include filtering, combining, or other processing at a satellite 120 or a component of a ground segment 102. The feed element signal receiver 410 may provide feed element signals 415 to the beamforming processor 420. In some examples, to generate the feed element signals 415, the feed element signals 405 may be filtered or otherwise processed to support frequency bands related to multi-static synthetic aperture radar. For example, the feed element signals 405 may include frequency bands used for communication in addition to a frequency band of interest for radar applications. To generate the feed element signals 415, the feed element signal receiver 410 may be configured to filter the feed element signals 405 according to a range of frequencies of interest for a radar application, or the feed element signal receiver 410 may be configured to perform other processing (e.g., frequency conversion, oversampling, downsampling) of the feed element signals 405.

In yet other cases, the feed element signals 405 may correspond to access node terminal signals (e.g., signals received at access node terminal antenna system 131) of an end-to-end beamforming system. Thus, each of the feed element signals may represent a composite of return uplink signals received at one or more receive feeds of an end-to-end relay and relayed to one of the access node terminals via a corresponding one or more transmit feeds of the end-to-end relay.

The feed element signals 405 may represent signal energy from a reflected illumination signal (e.g., beacon signal, communication signal), or passively received signal energy (e.g., without a corresponding illumination signal transmitted by the satellite system 100 for reflection).

In some examples, the feed element signals 405 may include multiple signals corresponding to each of multiple polarizations, and a multi-static synthetic aperture radar application may be configured to use different polarizations. The feed element signal receiver 410 may combine or otherwise process the feed element signals 405 to obtain the feed element signals 415 corresponding to a same feed element 128, or two or more feed elements 128 that share a common port or aperture, that are associated with different polarizations. The feed element signal receiver 410 may provide the feed element signals 415 to the beamforming processor 420. The feed element signal receiver 410 may also be configured to sample and store feed element signals 405 or other related signaling for later processing.

The beamforming processor 420 may be configured to process the feed element signals 415 by applying beam weights or coefficients to generate target spot beam signals associated with multi-static synthetic aperture radar. The spot beams 125 formed by the beamforming processor 420 may correspond to radar image pixel beams. The beamforming processor 420 may apply multiple beam weight sets 433, where each beam weight set 434 corresponds to one or more radar image pixel beams. Each beam weight set 434 may have a first dimension corresponding to the number of feed element signals. For example, the first dimension may equal the number of feeds for an OBBF or GBBF system, or the number of access node terminals for a system employing an end-to-end relay. The beam weight sets 434 may have a second dimension that is the same for each beam weight set, or some beam weight sets may have different sizes for the second dimension. For example, the second dimension may correspond to the number of beam signals generated from the beam weight set 434, and beam weight sets 434 may each generate the same number of beam signals, or some beam weight sets 434 may generate different numbers of beam signals. Each coefficient of the beam weight sets 434 may be a complex beam weight (e.g., including amplitude and phase components). Beamforming processor 420 may receive feed element signals 415 corresponding to a time duration and process feed element signals 415 according to each of multiple beam weight sets 433. For each of the multiple beam weight sets 433, beamforming processor 420 may generate a set of beam signals 425 (e.g., radar image pixel beams) corresponding to a beam coverage pattern.

In one example, the feed element signals 415 may correspond to return downlink signals received at satellite access nodes (e.g., from an end-to-end relay). The return downlink signals may be a composite of return uplink signals received by the satellite via an antenna illuminating a geographical region. Processing the feed element signals 415 may include processing a first set of signal data of the return downlink signal corresponding to a first time duration of the return downlink signal according to the plurality of beam weight sets. In some cases, the processing includes processing the first set of signal data according to a first beam weight set to obtain a first subset of the plurality of beam signals corresponding to a first beam coverage pattern and processing the first set of signal data according to a second beam weight set to obtain a second subset of the plurality of beam signals 425 corresponding to a second beam coverage pattern. The processing may include processing the first set of signal data according to additional beam weight sets to obtain additional subsets of the plurality of beam signals 425.

The beam signal processor 440 may generate image pixel values corresponding to the beam signals 425. An image pixel value may be generated for each radar image pixel beam (e.g., based on a signal level associated with the radar image pixel beam). For each set of beam signals 425, beam signal processor 440 may assign an image component (e.g., brightness, color) to various signal levels detected in the sets of beam signals 425. In addition, the beam signal processor 440 may receive beam location information 432 (e.g., according to the corresponding beam coverage pattern from beam weight sets 433) and assign the image values to pixel locations based on the corresponding beam location information. For example, where a second beam coverage pattern corresponding to a second beam weight set is offset from a first beam coverage pattern corresponding to a second beam weight set, the beam signal processor 440 may determine the image signal values 445 based at least in part on the offset.

In some examples, processing the sets of beam signals 425 may be based on an illumination signal. For example, where the feed element signals 405 include reflected energy from an illumination signal (e.g., transmitted by the satellite or a different satellite), the beam signal processor 440 may determine each image value based on a correlation of the corresponding beam signal with the illumination signal (e.g., amplitude and/or phase coherency between the illumination signal and corresponding beam signal). In addition, the beam signal processor 440 may apply extrinsic information to determine the image values. Extrinsic information may include information about known terrain features (e.g., altitude, buildings, surface composition) obtained from other sources (e.g., satellite imagery, altitude data, object databases), used to inform determination of image values. For example, altitude data may be used to calibrate a phase relationship of the beam signal to the illumination signal. In some aspects, the illumination signal may be a communication signal, and different locations may be associated with different communication signals (e.g., the illumination may be forward downlink signals 172, which may be different in different spot beams). The beam signal processor 440 may receive beam information 455, which may be used in determining image values. For example, beam information 455 may include, for a spot beam 125, a beam signal (e.g., modulated data signal, symbol information) and other beam parameters (e.g., beam gain over the beam coverage area). Thus, the beam signal processor 440 may evaluate the determined beam signal based on the transmitted signal and beam gain at the location corresponding to the image pixel beam to determine the image value. The beam signal processor 440 may output the sets of image signal values 445 (e.g., each set of image signal values corresponding to a set of beam signals 425) to the image processor 450.

In some cases, the beam signal processor 440 may filter the beam signals generated from different sets of feed elements signals (e.g., corresponding to different time durations). For example, the beamforming processor 420 may process a second set of signal data of the return downlink signal corresponding to a second time duration of the return downlink signal according to a second plurality of beam weight sets, which may be the same or different from the plurality of beam weight sets used for the first set of signal data. In some cases, each of the plurality of beam weight sets and the second plurality of beam weight sets may be configured to provide substantially the same or overlapping beam coverage patterns. For example, processing the second set of signal data may include processing the second set of signal data corresponding to the second time duration of the return downlink signal according to a third beam weight set to obtain a third subset of the plurality of beam signals corresponding to the first beam coverage pattern and processing the second set of signal data according to a fourth beam weight set to obtain a fourth subset of the plurality of beam signals corresponding to the second beam coverage pattern. That is, the first beam weight set and third beam weight set may be determined to provide beam coverage patterns with at least some substantially overlapping image pixel beams.

The beam signal processor 440 may filter the multiple subsets of the plurality of beam signals to obtain filtered subsets of beam signals. For example, the beam signal processor 440 may apply a filtering function to a number of beam signals associated with processed feed element signals corresponding to different dime durations to obtain the filtered subsets of beam signals. The filtering function may be, for example, averaging, or other finite impulse response (FIR) or infinite impulse response (IIR) filter. Thus, beam signal processor 440 may generate image signal values 445 from filtered beam signals.

The image processor 450 may receive each set of image signal values 445 and process the sets of image signal values 445 to generate an image 460. That is, the image processor 450 may combine the sets of image signal values 445 for multiple sets of beam signals 425 to generate an image 460. Additionally or alternatively to filtering performed by beam signal processor 440, image processor 450 may filter the image signal values 445 to generate image 460. For example, image processor 450 may combine multiple sets of image signal values (e.g., corresponding to the same pixel locations) to obtain the image 460. The filtering may include averaging, or other FIR or IIR filtering. In some examples, the imaging values associated with each radar image pixel beam may be converted to a 3-dimensional (3D) space, and thus the image processor 450 may generate a set of voxels or 3D representation of the imaged region.

In some examples, the beamforming processor 420 may process the feed element signals with multiple beam weight sets 433 for each of multiple frequency ranges or polarizations, and the beam signal processor 440 and image processor 450 may combine values of radar image pixel beams from different frequency ranges or polarizations to generate one or more images. For example, a first set of radar image pixel beams may correspond to radar image pixel beams associated with passive detection of (e.g., incidental) signal energy and a second set of radar image pixel beams may correspond to reflected signal energy from an illumination source (e.g., from the satellite or a one or more different satellites). Such combined data may overlay information associated with, for example, thermal emissions with reflected signal energy to provide additional information for an imaged region.

Additionally or alternatively, the beamforming processor 420 may process multiple sets of feed element signals corresponding to different time periods and the image processor 440 may combine beam signals 425 corresponding to the different time periods. For example, the feed element signals 405 may correspond to feed element signals of a GEO satellite or access node terminal signals relayed by a GEO end-to-end relay, and an illumination signal may be transmitted by one or more LEO satellites. A synthetic aperture given by the angle of illumination of the LEO satellite(s) may be provided by processing the multiple time periods corresponding to different positions of the LEO satellite(s). Thus, each set of feed element signals corresponding to one of the multiple time periods may be processed according to the multiple beam weight sets and position of the illumination source (e.g., LEO satellite) to obtain multiple sets of beam signals, and the multiple sets of beam signals may be combined to obtain a composite set of beam signals corresponding to the time period. Additional composite sets of beam signals may be obtained for different time periods and combined to obtain a synthetic aperture corresponding to the angular range of illumination for the one or more illumination sources.

In some cases, the reception processing system 400 may be configured to support a real-time or primary mission, such as a communications service or data collection service. For example, the beamforming processor 420 (or a different beamforming processor, in some cases) may be configured to process the feed element signals 415 by applying beam weights or coefficients to generate spot beam signals. The spot beams 125 formed by the beamforming processor 420 may refer to predetermined beams having substantially non-overlapping spot beam coverage areas 126, and for a given location, may use different frequency bands, polarizations, or both. The generated spot beam signals may be processed through the beam signal processor 440 (or a different beam signal process) and may be passed to a modem (not shown) for demodulation to support various return link communications (e.g., to obtain data signals transmitted by user terminals 150). The beam weight set applied for supporting return link communications may be different than the multiple beam weight sets used for obtaining the multiple sets of beam signals for the radar image pixel beams (e.g., the radar image pixel beams may be different from the spot beams used for the return link communications), or the beam weight set applied for supporting return link communications may be part of the multiple beam weight sets, in some cases.

In some cases, the feed element signal receiver 410 may be configured to perform signal cancellation or suppression of signals associated with the return link communications to obtain the feed element signals 415.

Figure 5:
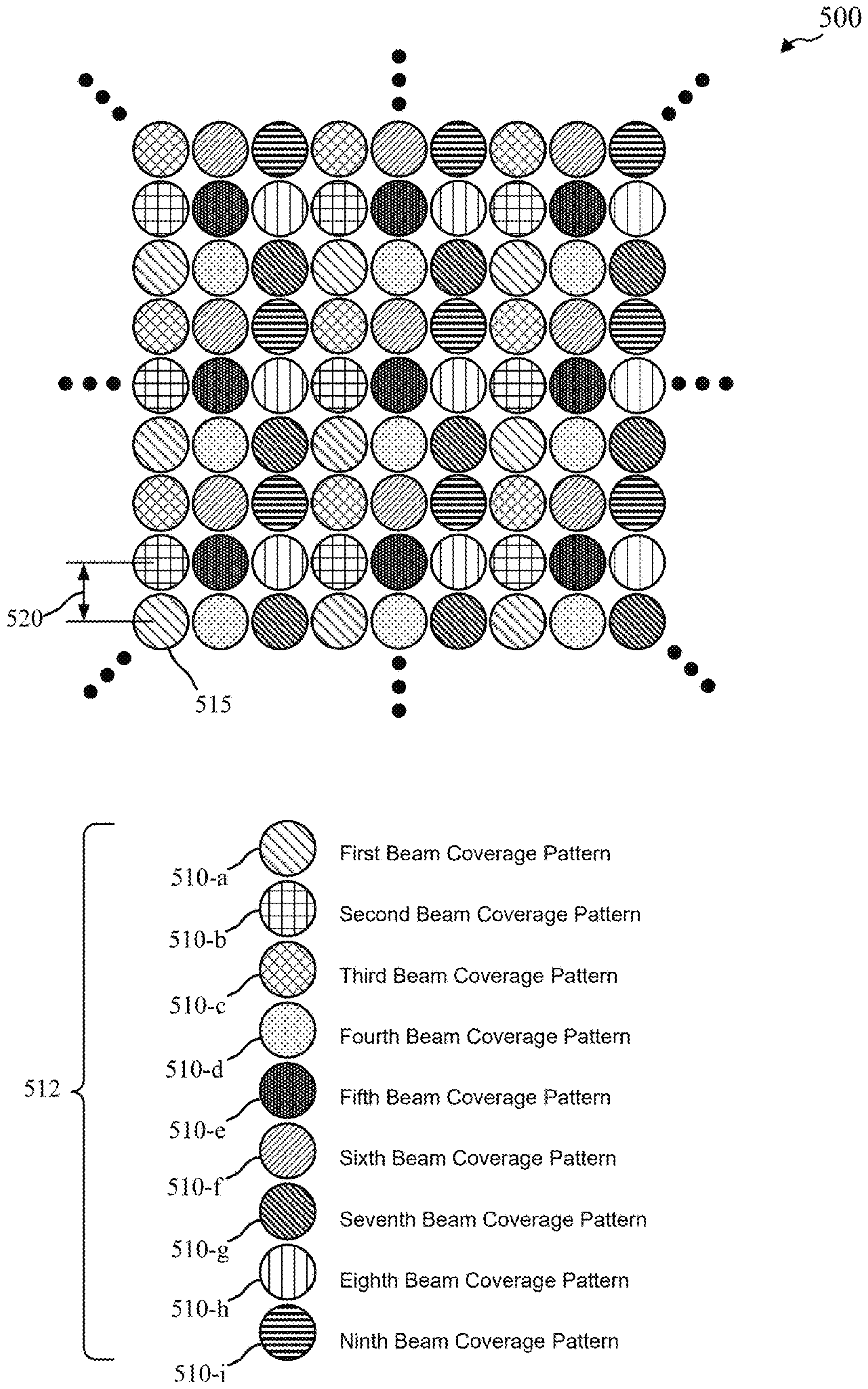
FIG. 5 illustrates an example of a composite beam coverage pattern that supports multi-static synthetic aperture radar in accordance with examples as disclosed herein.

FIG. 5 illustrates an example of a composite beam coverage pattern 500 that supports multi-static synthetic aperture radar in accordance with examples as disclosed herein. Composite beam coverage pattern 500 may include a set of beam coverage patterns 512, where each beam coverage pattern 510 of the set of beam coverage patterns 512 corresponds to a different beam weight set. In the illustrated example, the composite beam coverage pattern 500 includes nine beam coverage patterns 510, including beam coverage patterns 510-*a*, 510-*b*, 510-*c*, 510-*d*, 510-*e*, 510-*f*, 510-*g*, 510-*h*, and 510-*i*. Each of the beam coverage patterns may be offset from each other (e.g., offset in one dimension, offset in more than one dimension). For example, a first beam coverage pattern 510-*a* may be offset by offset 520 from a second beam coverage pattern 510-*b*. Thus, according to the example composite beam coverage pattern 500, a set of data of feed element signals 415 may be processed nine times, each a different beam weight set, to obtain nine sets of beam signals corresponding to each beam coverage pattern. However, composite beam coverage pattern 500 is merely one example, and a composite beam coverage pattern may be generated for any number of beam coverage patterns. Each set of beam signals may include one or more beam signals, each corresponding to a location within composite beam coverage pattern 500. Each beam signal may then be assigned an image value (e.g., corresponding to a signal value of incident signals or reflected signals in the beam signal).

Although each beam coverage pattern 510 is illustrated as non-overlapping with other beam coverage patterns, it should be understood that each beam coverage pattern may represent signal power received from one or more spatial directions and that portions of beam coverage patterns may overlap with each other. The beam coverage pattern may represent the spatial information assigned to a given beam weight set, which may generally be a center of each region of receive beamformed signal energy. That is, a beam gain pattern for a given beam coverage area 515 (e.g., given by a gain contour such as 3 dB) may be circular or a variety of shapes depending on an orbit of the satellite or terrain features and the applied beam weight set, with a location assigned for the beam signal based on a centroid (e.g., of a beam contour such as a 1 dB or 3 dB contour) or location of a highest beamforming gain of the beam coverage area 515.

Figure 6:
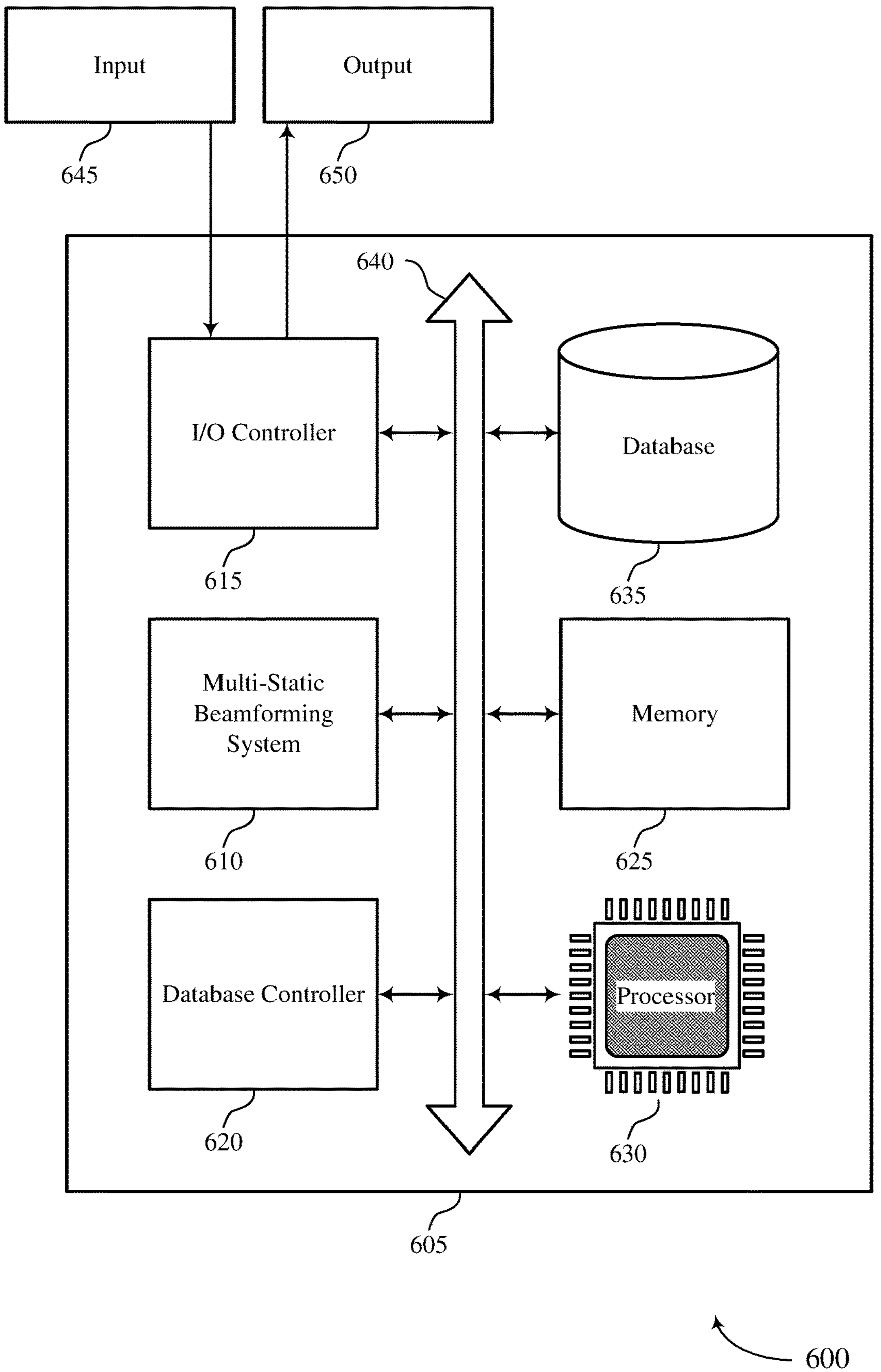
FIG. 6 shows a diagram of a system including a device that supports techniques for multi-static synthetic aperture radar in accordance with examples as disclosed herein.

FIG. 6 shows a diagram of a system 600 including a device 605 that supports techniques for multi-static synthetic aperture radar in accordance with examples as disclosed herein. The device 605 may be an example of or include the components of a reception processing system as described herein. The device 605 may include components for bi-directional data communications including components for transmitting and receiving communications, including a multi-static beamforming system 610, an I/O controller 615, a database controller 620, memory 625, a processor 630, and a database 635. These components may be in electronic communication via one or more buses (e.g., bus 640).

The multi-static beamforming system 610 may be an example of a reception processing system 400 as described herein. In some cases, the multi-static beamforming system 610 may be implemented in hardware, software executed by a processor, firmware, or any combination thereof. For example, the multi-static beamforming system 610 may receive feed element signals (e.g., via I/O controller 615) and process the feed elements signals to generate multi-static synthetic radar aperture images. The feed element signals may correspond to feed element signals received at feed elements of a beamforming satellite (e.g., OBBF or GBBF system), or may be access node terminal signals for a system employing an end-to-end relay. The multi-static beamforming system 610 may process the feed elements signals according to multiple beam weight sets, where each beam weight set may correspond to a pattern of radar image pixel beams. The multi-static beamforming system 610 may generate a set of image pixel values for each set of radar image pixel beams, and may combine the sets of image pixel values to generate one or more images. The multi-static beamforming system 610 may output the images in output signals 650 via I/O controller 615 (e.g., for display on a display device or storage on a storage medium).

The I/O controller 615 may manage input signals 645 and output signals 650 for the device 605. The I/O controller 615 may also manage peripherals not integrated into the device 605. In some cases, the I/O controller 615 may represent a physical connection or port to an external peripheral. In some cases, the I/O controller 615 may utilize an operating system such as iOS®, ANDROID®, MS-DOS®, MS-WINDOWS®, OS/2®, UNIX®, LINUX®, or another known operating system. In other cases, the I/O controller 615 may represent or interact with a modem, a keyboard, a mouse, a touchscreen, or a similar device. In some cases, the I/O controller 615 may be implemented as part of a processor. In some cases, a user may interact with the device 605 via the I/O controller 615 or via hardware components controlled by the I/O controller 615.

The database controller 620 may manage data storage and processing in a database 635. In some cases, a user may interact with the database controller 620. In other cases, the database controller 620 may operate automatically without user interaction. The database 635 may be an example of a single database, a distributed database, multiple distributed databases, a data store, a data lake, or an emergency backup database. The database 635 may, for example, store the multiple beam weight sets for use by the multi-static beamforming system 610.

Memory 625 may include random-access memory (RAM) and read-only memory (ROM). The memory 625 may store computer-readable, computer-executable software including instructions that, when executed (e.g., by processor 630), cause the processor to perform various functions described herein. For example, the memory 625 may store instructions for the operations of the multi-static beamforming system 610 described herein. In some cases, the memory 625 may contain, among other things, a basic input/output system (BIOS) which may control basic hardware or software operation such as the interaction with peripheral components or devices.

The processor 630 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in a memory 625 to perform various functions.

Figure 7:
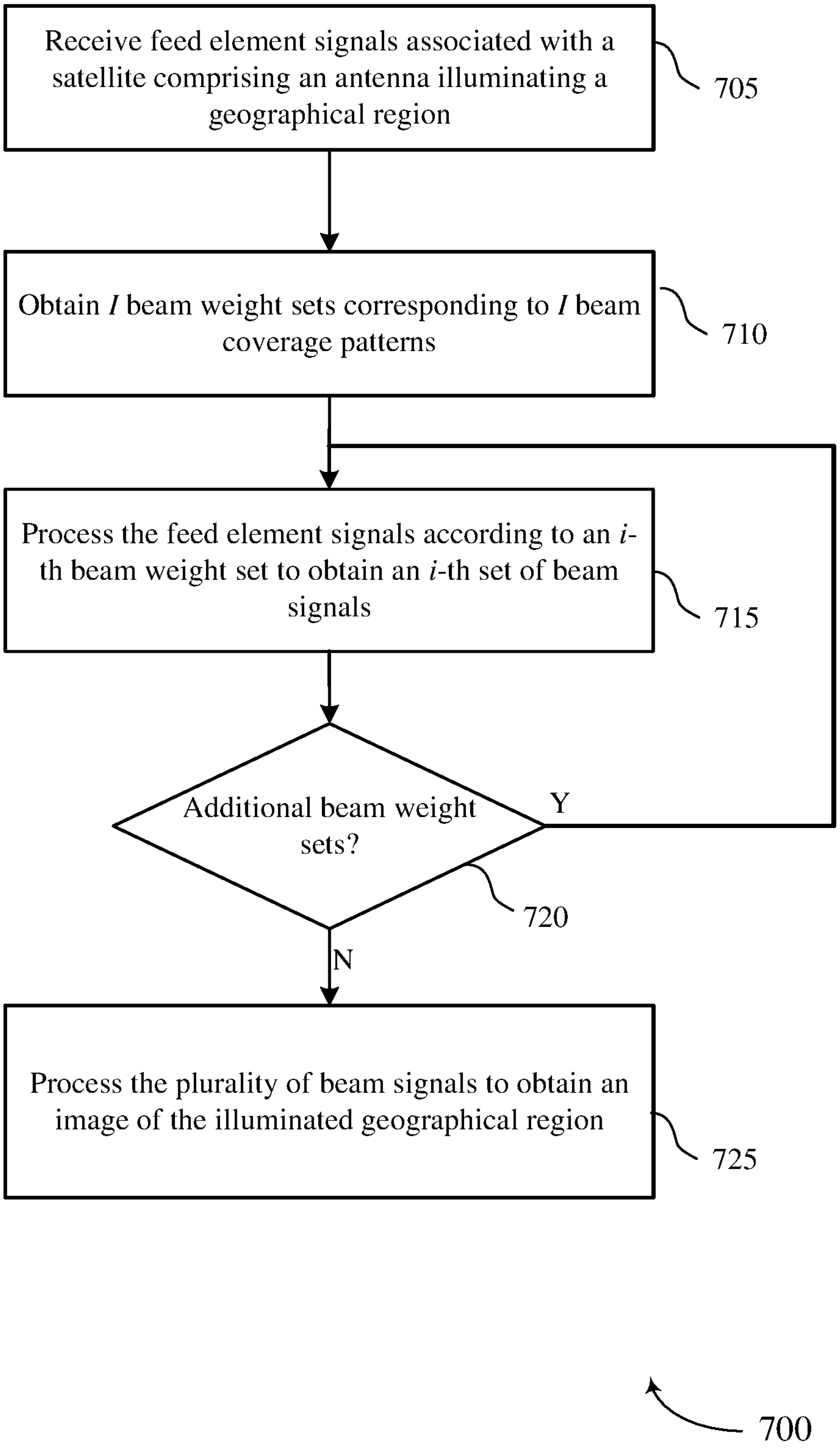
FIG. 7 shows a process flow that supports techniques for multi-static synthetic aperture radar in accordance with examples as disclosed herein.

FIG. 7 shows a process flow 700 that supports techniques for multi-static synthetic aperture radar in accordance with examples as disclosed herein. The process flow 700 may be implemented, for example, by the reception processing system 400 of FIG. 4 or the multi-static beamforming system 610 of FIG. 6.

The process flow 700 may represent a process for forming a multi-static synthetic aperture radar image from a system that supports beamforming of received signals (e.g., OBBF system, GBBF system, end-to-end beamforming system).

The system may receive feed elements signals associated with a satellite comprising an antenna illuminating a geographical region at 705. For example, the feed element signals may correspond to feed element signals received at feed elements of a beamforming satellite (e.g., OBBF or GBBF system), or may be access node terminal signals for a system employing an end-to-end relay. The received feed element signals may correspond to a period of time. For example, the feed elements signals may be processed according to a frame timing, which may correspond to a time duration of a communication system (e.g., a communication symbol or frame).

At 710, the system may obtain I beam weight sets corresponding to I beam coverage patterns. For example, each of the I beam weight sets may be associated with one or more radar image pixel beams, which may be associated with geographic locations of the geographical region. The associated geographic locations may be, for example, a geographic center (e.g., centroid) or point of highest gain of the radar image pixel beams.

At 715, the system may process the feed elements signals according to an i-th beam weight set to obtain an i-th set of beam signals.

At 720, the system may determine if there are additional beam weight sets for processing of the feed elements signals. For example, if $i<I$ (where $i \in \{1 \ldots I\}$, the system may increment i and return to 715 to process the feed element signals according to the next beam weight set. If the I beam weight sets have been processed at 720, the system may proceed to 725 to process the sets of beam signals.

At 720, the system may process the sets of beam signals to obtain an image of the illuminated geographical region. For example, the system may assign pixel image values to each of the beam signals. In some cases, the assignment of pixel image values to each of the beam signals may take into account whether the feed element signals include signal information associated with incidental or passive emissions, or with reflections of an illumination source. The illumination source may be, for example, a broad beam signal (e.g., a single beam covering the illuminated geographical region such as from a beacon signal), or a multi-beam signal (e.g., user beams for communications via a multi-beam satellite). For illumination using a multi-beam signal, the system may determine the pixel image values based on the beam signals and characteristics of a corresponding beam signal at the location associated with the beam signal. For example, a first beam signal may be associated with a center of a user beam and a second beam signal may be associated with an edge of a user beam. The system may determine pixel image values by scaling the beam signals by the incident energy of the user beam at the location of the beam signal. That is, the first beam signal and second beam signal may be normalized by the gain pattern of the user beam.

Thus, the system may obtain multiple sets of pixel image values corresponding to the sets of beam signals. The system may then combine the multiple sets of pixel image values to obtain an image of at least a portion of the illuminated geographical region. As discussed above, the system may perform the beam weight set processing for multiple frequency bands or polarizations to obtain multiple pixel image values for each pixel location of the image, and may combine (e.g., by pixel brightness or hue) the multiple pixel image values to obtain each final pixel image value of the image.

It should be noted that the described techniques refer to possible implementations, and that operations and components may be rearranged or otherwise modified and that other implementations are possible. Further portions from two or more of the methods or apparatuses may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for imaging using a satellite, comprising:

receiving a return downlink signal at a satellite access node, wherein the return downlink signal comprises a composite of return uplink signals received by the satellite via a plurality of feed elements of a return uplink feed array assembly of an antenna illuminating a geographical region;

processing the return downlink signal according to a plurality of beam weight sets to obtain a plurality of beam signals, the plurality of beam weight sets corresponding to a respective plurality of beam coverage patterns, wherein a first beam coverage pattern of the plurality of beam coverage patterns comprises a first plurality of beam coverage areas associated with a first polarization and a first frequency range, and wherein a second beam coverage pattern of the plurality of beam coverage patterns comprises a second plurality of beam coverage areas associated with the first polarization and the first frequency range, and wherein the second plurality of beam coverage areas are offset from the first plurality of beam coverage areas, and wherein processing the return downlink signal comprises:

processing a first set of signal data of the return downlink signal according to the plurality of beam weight sets, the first set of signal data corresponding to a first time duration of the return downlink signal, wherein processing the return downlink signal according to the plurality of beam weight sets comprises:

processing the first set of signal data according to a first beam weight set corresponding to the first beam coverage pattern to obtain a first subset of the plurality of beam signals corresponding to the first beam coverage pattern; and processing the first set of signal data according to a second beam weight set corresponding to the second beam coverage pattern to obtain a second subset of the plurality of beam signals corresponding to the second beam coverage pattern; and processing the plurality of beam signals to obtain an image of the illuminated geographical region comprising image pixel values corresponding to the plurality of beam signals.

2. The method of claim 1, wherein each beam coverage area of the second plurality of beam coverage areas partially overlaps a corresponding beam coverage area of the first plurality of beam coverage areas.

3. The method of claim 1, wherein processing the plurality of beam signals to obtain the image of the illuminated geographical region comprises:

generating a first set of the image pixel values from the first subset of the plurality of beam signals;

generating a second set of the image pixel values from the second subset of the plurality of beam signals; and combining the first set of the image pixel values and the second set of the image pixel values according to the offset between the second plurality of beam coverage areas and the first plurality of beam coverage areas.

4. The method of claim 3, wherein processing the return downlink signal according to the plurality of beam weight sets comprises:

processing a second set of signal data corresponding to a second time duration of the return downlink signal according to a third beam weight set to obtain a third subset of the plurality of beam signals corresponding to the first beam coverage pattern; and processing the second set of signal data according to a fourth beam weight set to obtain a fourth subset of the plurality of beam signals corresponding to the second beam coverage pattern.

5. The method of claim 4, wherein processing the plurality of beam signals to obtain the image of the illuminated geographical region comprises:

filtering the first and third subsets of the plurality of beam signals to obtain a first filtered subset of beam signals;

generating a first set of the image pixel values from the first filtered subset of beam signals;

filtering the second and fourth subsets of the plurality of beam signals to obtain a second filtered subset of beam signals;

generating a second set of the image pixel values from the second filtered subset of beam signals; and combining the first set of the image pixel values and the second set of the image pixel values according to the offset between the second plurality of beam coverage areas and the first plurality of beam coverage areas.

6. The method of claim 4, wherein processing the plurality of beam signals to obtain the image of the illuminated geographical region comprises:

generating a third set of the image pixel values from the third subset of the plurality of beam signals;

generating a fourth set of the image pixel values from the fourth subset of the plurality of beam signals;

filtering the first and third sets of the image pixel values to obtain a first filtered set of image pixel values;

filtering the second and fourth sets of the image pixel values to obtain a second filtered set of image pixel values; and combining the first filtered set of image pixel values and the second filtered set of image pixel values according to the offset between the second plurality of beam coverage areas and the first plurality of beam coverage areas.

7. The method of claim 1, wherein the return downlink signal comprises a plurality of return downlink signals, each of the plurality of return downlink signals corresponding to a return uplink signal received by a feed of an antenna array of the satellite.

8. The method of claim 1, wherein receiving the return downlink signal comprises:

receiving a plurality of return downlink signals at a respective plurality of satellite access nodes, each of the plurality of return downlink signals comprising a composite of one or more of the return uplink signals.

9. The method of claim 1, wherein each of the plurality of beam coverage patterns comprises a plurality of beam coverage areas.

10. The method of claim 1, wherein the satellite transmits a beacon signal and relays respective reflections of the beacon signal received at the plurality of feed elements of the satellite, and wherein the return downlink signal comprises the relayed respective reflections.

11. The method of claim 1, wherein the satellite access node transmits a forward uplink signal and the satellite relays the forward uplink signal via a plurality of feed elements of a forward downlink feed array assembly of the satellite, and wherein the satellite relays respective reflections of the relayed forward uplink signal received at the plurality of feed elements of the return uplink feed array assembly, and wherein the return downlink signal comprises the relayed respective reflections.

12. The method of claim 11, wherein the forward uplink signal comprises a plurality of forward user data streams for transmission to a plurality of user terminals within the geographical region.

13. The method of claim 1, wherein the satellite is a first satellite and one or more second satellites transmit respective illuminating signals over the geographical region, and wherein first the satellite relays respective reflections of the illuminating signals received at the plurality of feed elements of the return uplink feed array assembly of the first satellite, and wherein the return downlink signal comprises the relayed respective reflections.

14. The method of claim 13, wherein the first satellite is a geostationary (GEO) satellite and each of the one or more second satellites is a low earth orbit (LEO) satellite.

15. An imaging system, comprising:

a satellite access node configured to receive a return downlink signal, wherein the return downlink signal comprises a composite of return uplink signals received by a satellite via a plurality of feed elements of a return uplink feed array assembly of an antenna illuminating a geographical region; and at least one processor configured to:

process the return downlink signal according to a plurality of beam weight sets to obtain a plurality of beam signals, the plurality of beam weight sets corresponding to a respective plurality of beam coverage patterns, wherein a first beam coverage pattern of the plurality of beam coverage patterns comprises a first plurality of beam coverage areas associated with a first polarization and a first frequency range, and wherein a second beam coverage pattern of the plurality of beam coverage patterns comprises a second plurality of beam coverage areas associated with the first polarization and the first frequency range, and wherein the second plurality of beam coverage areas are offset from the first plurality of beam coverage areas, and wherein, to process the return downlink signal, the at least one processor is configured to:

process a first set of signal data of the return downlink signal according to the plurality of beam weight sets, the first set of signal data corresponding to a first time duration of the return downlink signal, wherein, to process the return downlink signal according to the plurality of beam weight sets, the at least one processor is configured to:

process the first set of signal data according to a first beam weight set corresponding to the first beam coverage pattern to obtain a first subset of the plurality of beam signals corresponding to the first beam coverage pattern; and process the first set of signal data according to a second beam weight set corresponding to the second beam coverage pattern to obtain a second subset of the plurality of beam signals corresponding to the second beam coverage pattern; and process the plurality of beam signals to obtain an image of the illuminated geographical region comprising image pixel values corresponding to the plurality of beam signals.

16. The imaging system of claim 15, wherein each beam coverage area of the second plurality of beam coverage areas partially overlaps a corresponding beam coverage area of the first plurality of beam coverage areas.

17. The imaging system of claim 15, wherein, to process the plurality of beam signals to obtain the image of the illuminated geographical region the at least one processor is configured to:

generate a first set of the image pixel values from the first subset of the plurality of beam signals;

generate a second set of the image pixel values from the second subset of the plurality of beam signals; and combine the first set of the image pixel values and the second set of the image pixel values according to the offset between the second plurality of beam coverage areas and the first plurality of beam coverage areas.

18. The imaging system of claim 17, wherein, to process the return downlink signal according to the plurality of beam weight sets, the at least one processor is configured to:

process a second set of signal data corresponding to a second time duration of the return downlink signal according to a third beam weight set to obtain a third subset of the plurality of beam signals corresponding to the first beam coverage pattern; and process the second set of signal data according to a fourth beam weight set to obtain a fourth subset of the plurality of beam signals corresponding to the second beam coverage pattern.

19. The imaging system of claim 18, wherein, to process the plurality of beam signals to obtain the image of the illuminated geographical region the at least one processor is configured to:

filter the first and third subsets of the plurality of beam signals to obtain a first filtered subset of beam signals;

generate a first set of the image pixel values from the first filtered subset of beam signals;

filter the second and fourth subsets of the plurality of beam signals to obtain a second filtered subset of beam signals;

generate a second set of the image pixel values from the second filtered subset of beam signals; and combine the first set of the image pixel values and the second set of the image pixel values according to the offset between the second plurality of beam coverage areas and the first plurality of beam coverage areas.

20. The imaging system of claim 18, wherein, to process the plurality of beam signals to obtain the image of the illuminated geographical region the at least one processor is configured to:

generate a third set of the image pixel values from the third subset of the plurality of beam signals;

generate a fourth set of the image pixel values from the fourth subset of the plurality of beam signals;

filter the first and third sets of the image pixel values to obtain a first filtered set of image pixel values;

filter the second and fourth sets of the image pixel values to obtain a second filtered set of image pixel values; and combining the first filtered set of image pixel values and the second filtered set of image pixel values according to the offset between the second plurality of beam coverage areas and the first plurality of beam coverage areas.

21. The imaging system of claim 15, wherein the return downlink signal comprises a plurality of return downlink signals, each of the plurality of return downlink signals corresponding to a return uplink signal received by a feed of an antenna array of the satellite.

22. The imaging system of claim 15, wherein, to receive the return downlink signal, the at least one processor is configured to:

receive a plurality of return downlink signals at a respective plurality of satellite access nodes, each of the plurality of return downlink signals comprising a composite of one or more of the return uplink signals.

23. The imaging system of claim 15, wherein each of the plurality of beam coverage patterns comprises a plurality of beam coverage areas.

24. The imaging system of claim 15, wherein the satellite transmits a beacon signal and relays respective reflections of the beacon signal received at the plurality of feeds of an antenna array of the satellite, and wherein the return downlink signal comprises the relayed respective reflections.

25. The imaging system of claim 15, wherein the satellite access node transmits a forward uplink signal and the satellite relays the forward uplink signal via a plurality of feed elements of a forward downlink feed array assembly of the satellite, and wherein the satellite relays respective reflections of the relayed forward uplink signal received at the plurality of feed elements of the return uplink feed array assembly, and wherein the return downlink signal comprises the relayed respective reflections.

26. The imaging system of claim 25, wherein the forward uplink signal comprises a plurality of forward user data streams for transmission to a plurality of user terminals within the geographical region.

27. The imaging system of claim 15, wherein the satellite is a first satellite and one or more second satellites transmit respective illuminating signals over the geographical region, and wherein the first satellite relays respective reflections of the illuminating signals received at the plurality of feed elements of the return uplink feed array assembly of the first satellite, and wherein the return downlink signal comprises the relayed respective reflections.

28. The imaging system of claim 27, wherein the first satellite is a geostationary (GEO) satellite and each of the one or more second satellites is a low earth orbit (LEO) satellite.

* * * * *